Feb. 23, 1926.  
W. G. BLAUVELT  
1,573,907  
TELEPHONE EXCHANGE SYSTEM  
Filed May 20, 1925   15 Sheets-Sheet 1

Inventor:  
William G. Blauvelt.  
by ..... Atty.

Feb. 23, 1926.

W. G. BLAUVELT

TELEPHONE EXCHANGE SYSTEM

Filed May 20, 1925    15 Sheets-Sheet 11

Inventor:
William G. Blauvelt.
by    Atty.

Patented Feb. 23, 1926.

1,573,907

UNITED STATES PATENT OFFICE.

WILLIAM G. BLAUVELT, OF NEW YORK, N. Y., ASSIGNOR TO AMERICAN TELEPHONE AND TELEGRAPH COMPANY, A CORPORATION OF NEW YORK.

TELEPHONE-EXCHANGE SYSTEM.

Application filed May 20, 1925. Serial No. 31,659.

*To all whom it may concern:*

Be it known that I, WILLIAM G. BLAUVELT, a citizen of the United States, residing at New York, in the county of New York and State of New York, have invented certain Improvements in Telephone-Exchange Systems, of which the following is a specification.

The present invention relates to telephone exchange systems and particularly to such systems wherein connections are established by means of automatic switches.

In the case of power driven automatic apparatus, adaptable for multi-office areas, it is customary to make selections under the control of a register sender which is set by the dial interruptions from a subscriber's station or by apparatus in a distant office sender. In this arrangement of selecting apparatus translators are provided for translating the record of the office code in the sender into registrations such as may be used for selecting the proper office. This translation occupies only a small portion of the time interval during which the sender is employed and since each translator is made up of considerable apparatus, it is desirable for economic reasons to separate the translator from the sender in order that the number of translators may be materially reduced. Heretofore such translators have been permanently associated with register senders.

It is an object of the present invention to provide common translators which may be selected for use by any one of a number of register senders.

A feature of the invention lies in means for positioning a selected translator under the control of counting relays.

Another feature of the invention lies in the provision of a plurality of groups of translators with means for discriminating between groups of translators in accordance with the code which they are adapted to translate.

The above described invention has been set forth in connection with a tandem sender, that is, a sender which is employed in a tandem office for receiving designations from originating offices and for controlling selections at a third office.

A sender of this type is shown in United States patent to F. A. Stearn, No. 1,501,871, issued July 15, 1924.

Referring now to the drawings, Figure 1 shows in diagrammatic form a subscriber's line with selectors for extending said lines and a sender for controlling such selectors.

Fig. 16 shows the manner of arranging Figs. 1 to 15 to make up the disclosure of the present invention.

Before proceeding with the detail description of the operation a brief summary of the operation may be desirable.

Figure 4:
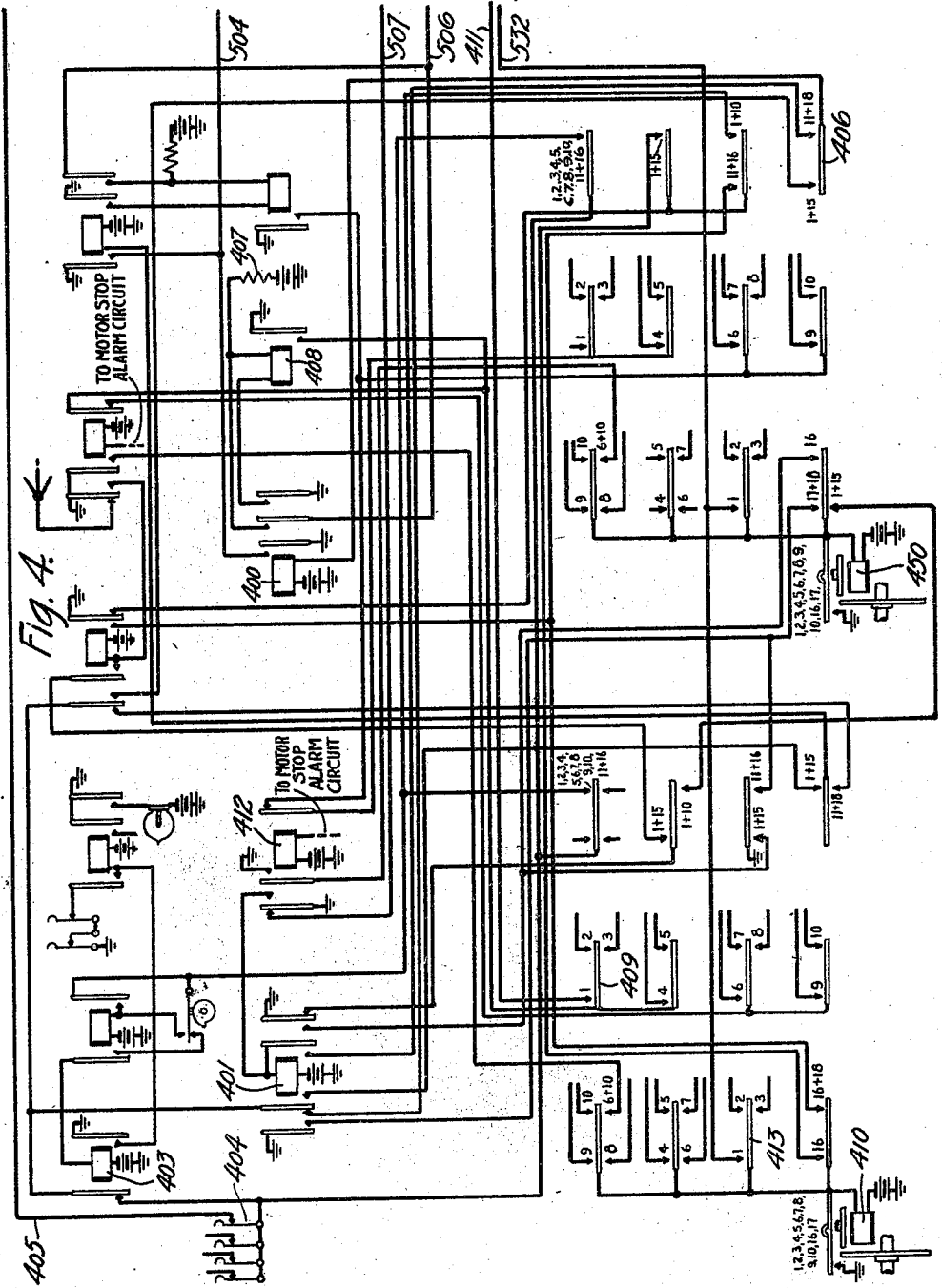
Fig. 4 shows an allotter switch for allotting link circuits.
Figure 5:
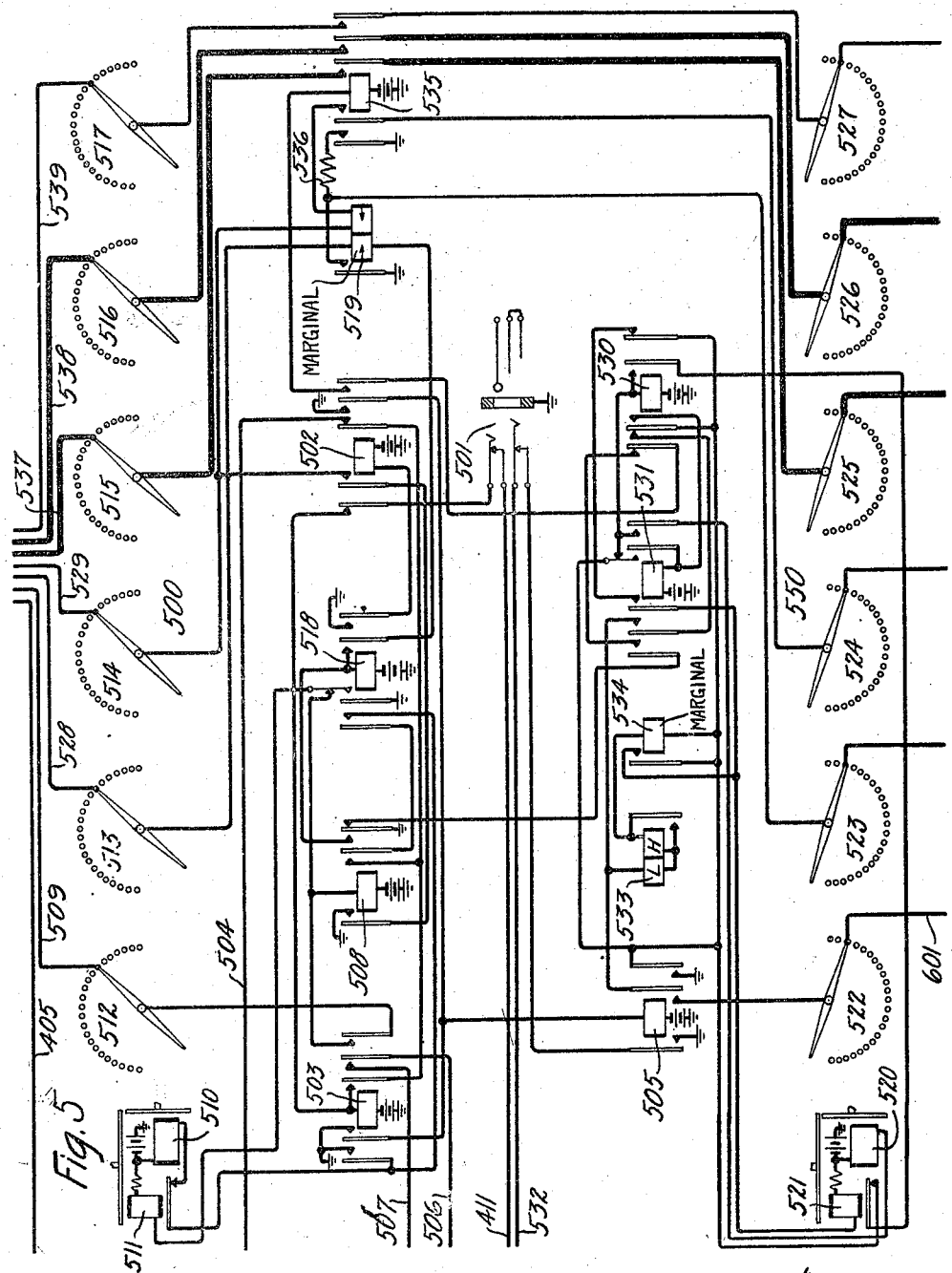
Fig. 5 shows a link circuit for associating the sender and the district selector of Fig. 2.
Figure 6:
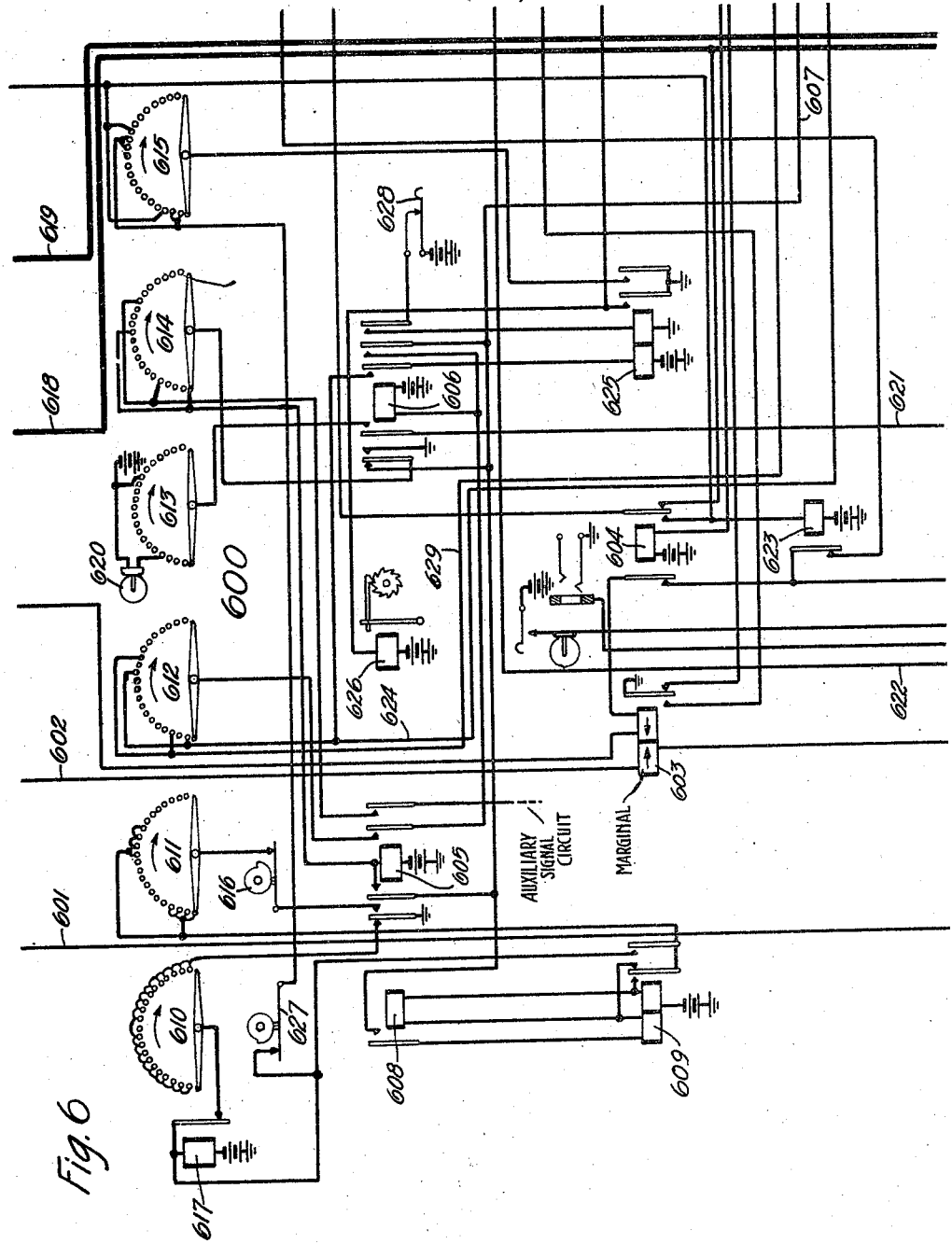
Fig. 6 shows a timing switch and means for controlling the wipe out of a call.

When the subscriber at substation 100 in office X removes his receiver from the hook, the line switch 101 functions to connect the line with an idle district selector such as 102. The district selector causes the association therewith of the register sender 104. The subscriber then dials the number of the wanted subscriber. Assuming that the office code is one which requires extension through a tandem office, the sender will control the district selector 102 and the office selector 103 to select an outgoing trunk to the tandem office Y. When the call is received at district selector 200 a circuit is completed through the allotter of Fig. 4 to cause the link circuit of Fig. 5 to hunt for and find the district selector 200 and also to hunt for an idle sender.

Figure 8:
Fig. 8 shows a plurality of relay registers for registering the relay call indicator impulses received.
Figure 9:
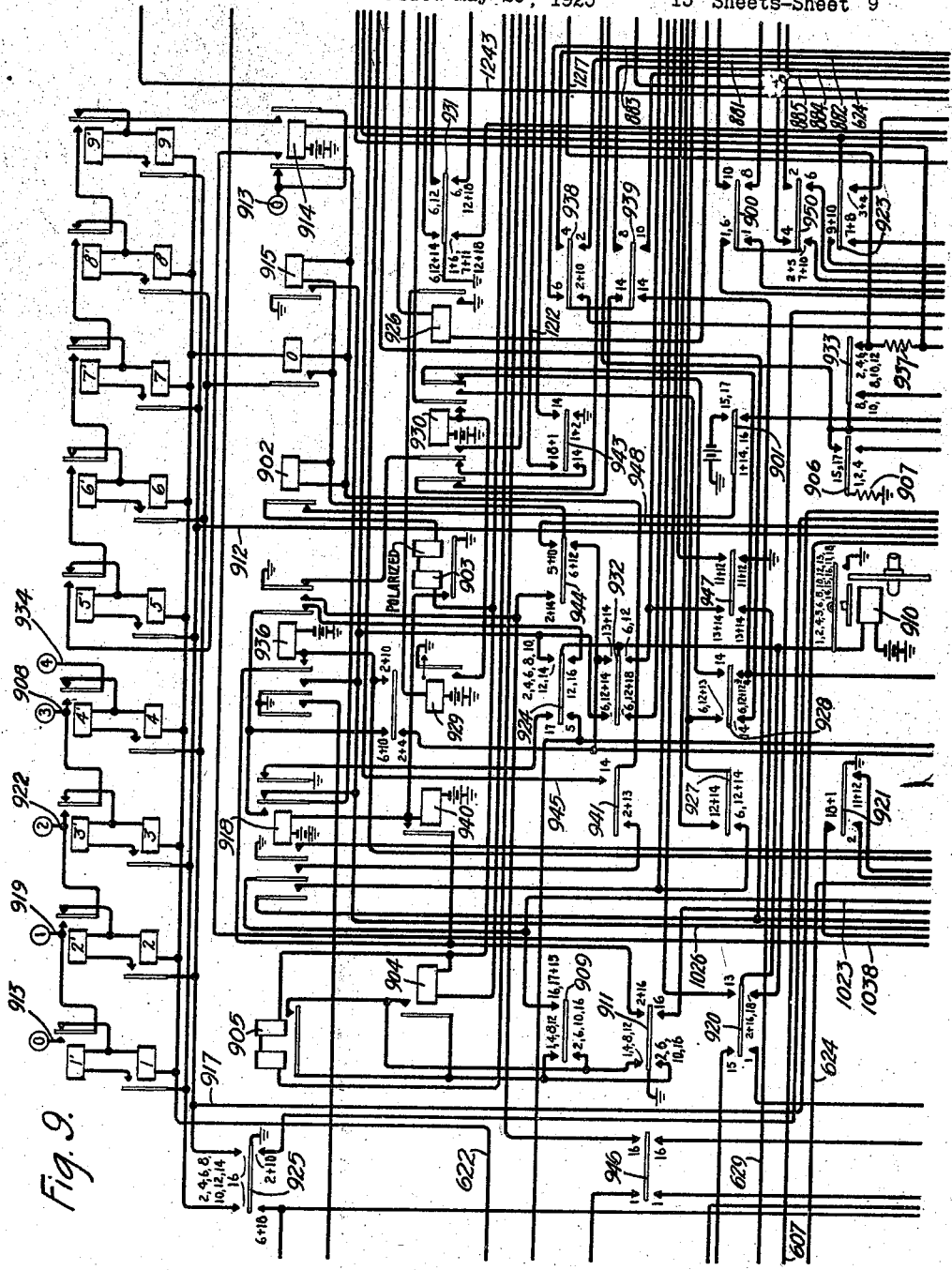
Fig. 9 shows the counting relays and sequence switch for controlling selections.
Figure 11:
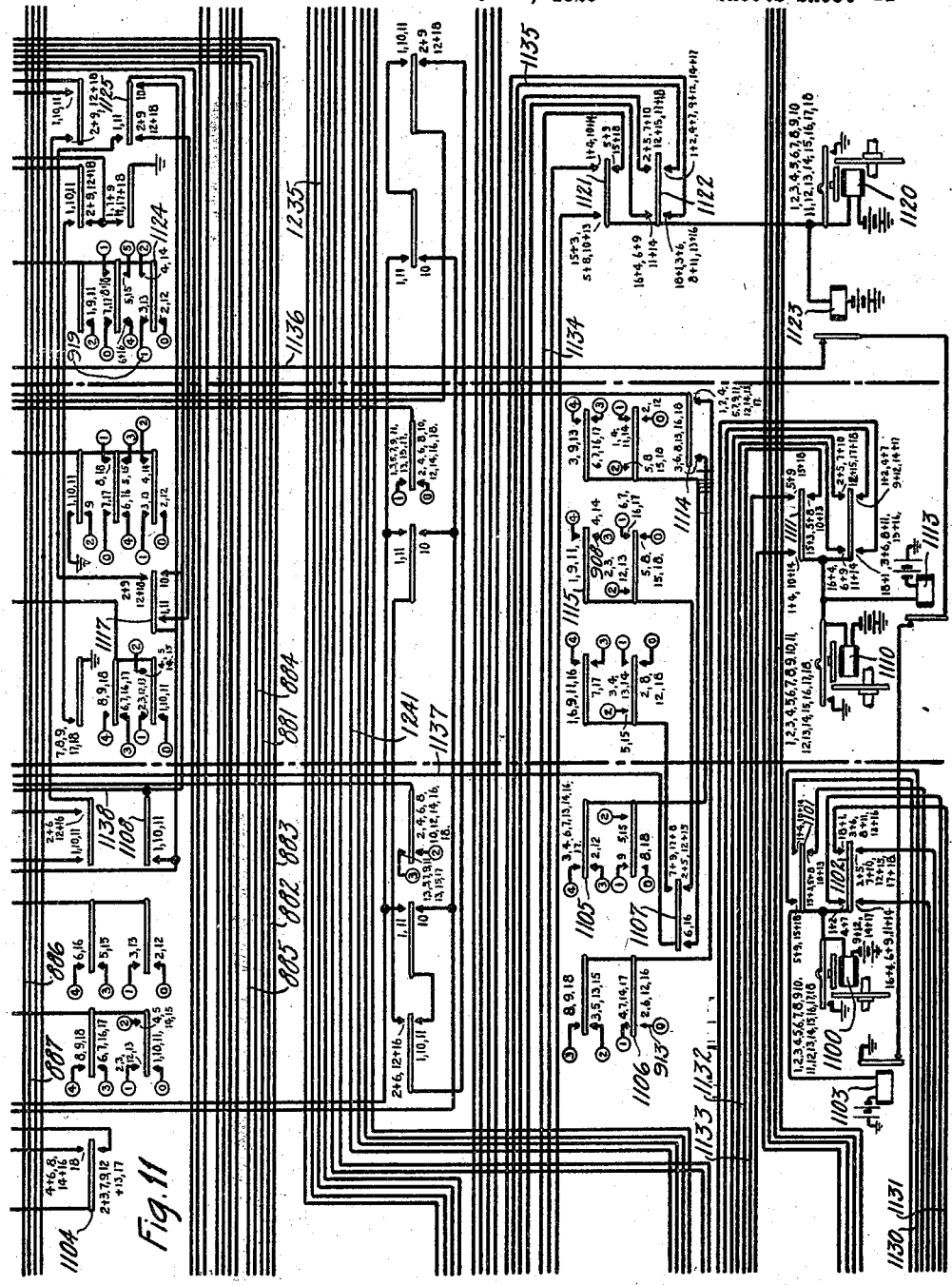
Fig. 11 shows a group of registers for controlling the setting of the translator.
Figure 12:
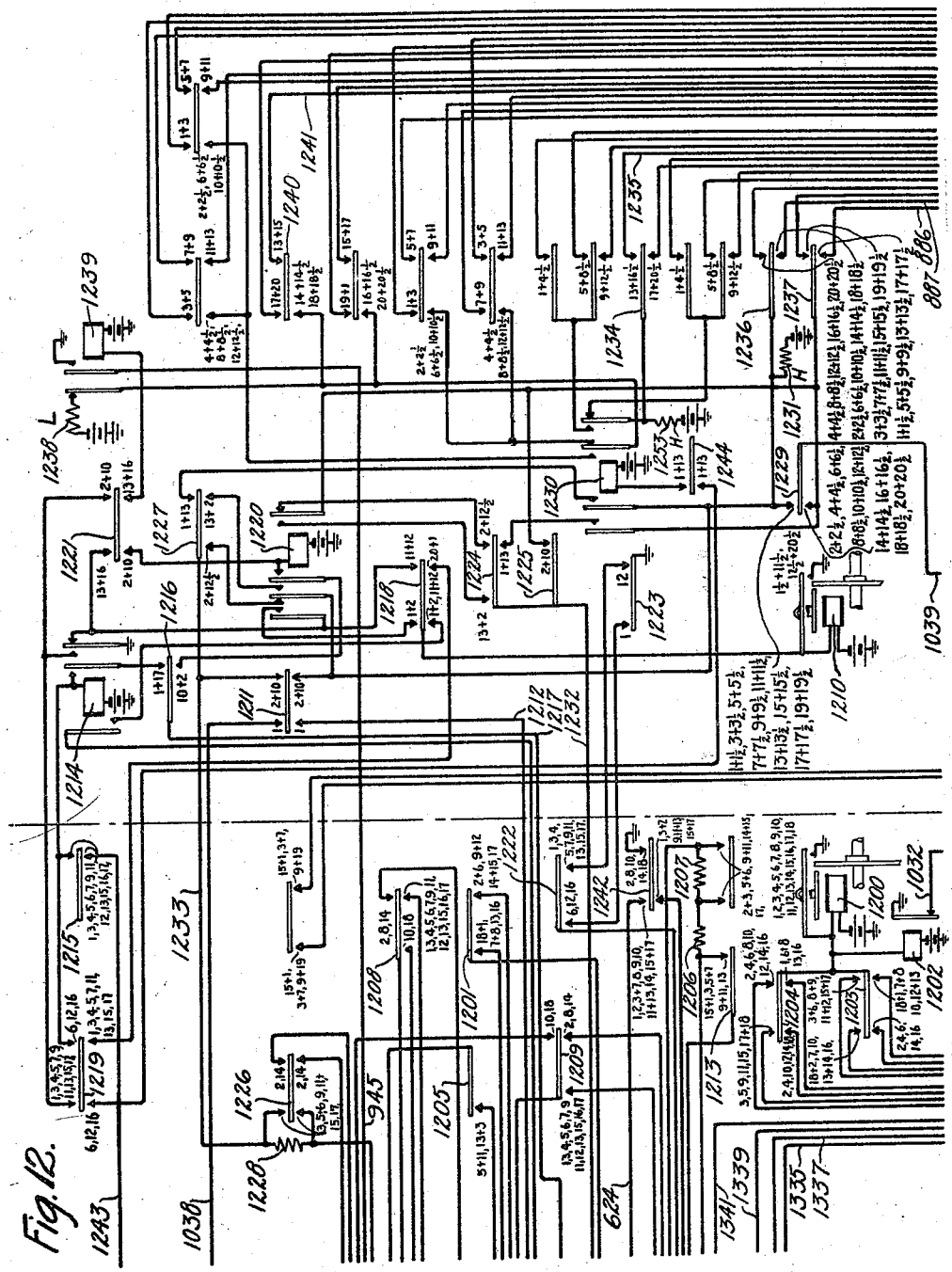
Fig. 12 shows the class switches and the relay call indicator impulse generating witch.

When the sender has been found, the district selector 200 causes the sender 104 to transmit code impulses corresponding to the complete designation as registered on that sender, which impulses are recorded on the registers of Fig. 8. As soon as the code registers of Fig. 8 have been set, the registration is transferred to the registers of Fig. 11. According to the setting of these registers, one of the relays 1007, 1011, 1012 and 1013 are operated to start a finder switch, such as shown in Fig. 14, hunting for an idle translator in the group corresponding to the relay operated. Each group of translators serves to translate a particular class of office codes. Four groups are provided in the present disclosure, two for codes dialed by subscribers directly and two for those dialed by operators. The codes used by each class of dialer are subdivided for the purpose of rendering the maximum number of codes available. The translator such as 1500 is then positioned under the control of the registers of Fig. 11, the counting relays of Fig. 9 and sequence switch 1010 to select the terminals corresponding to the particular office code dialed. As soon as translator 1500 is positioned, circuits are established between the pulse machine 1550 and the register relays of Fig. 13 to set up thereon the designations necessary to select the desired office.

Figure 13:
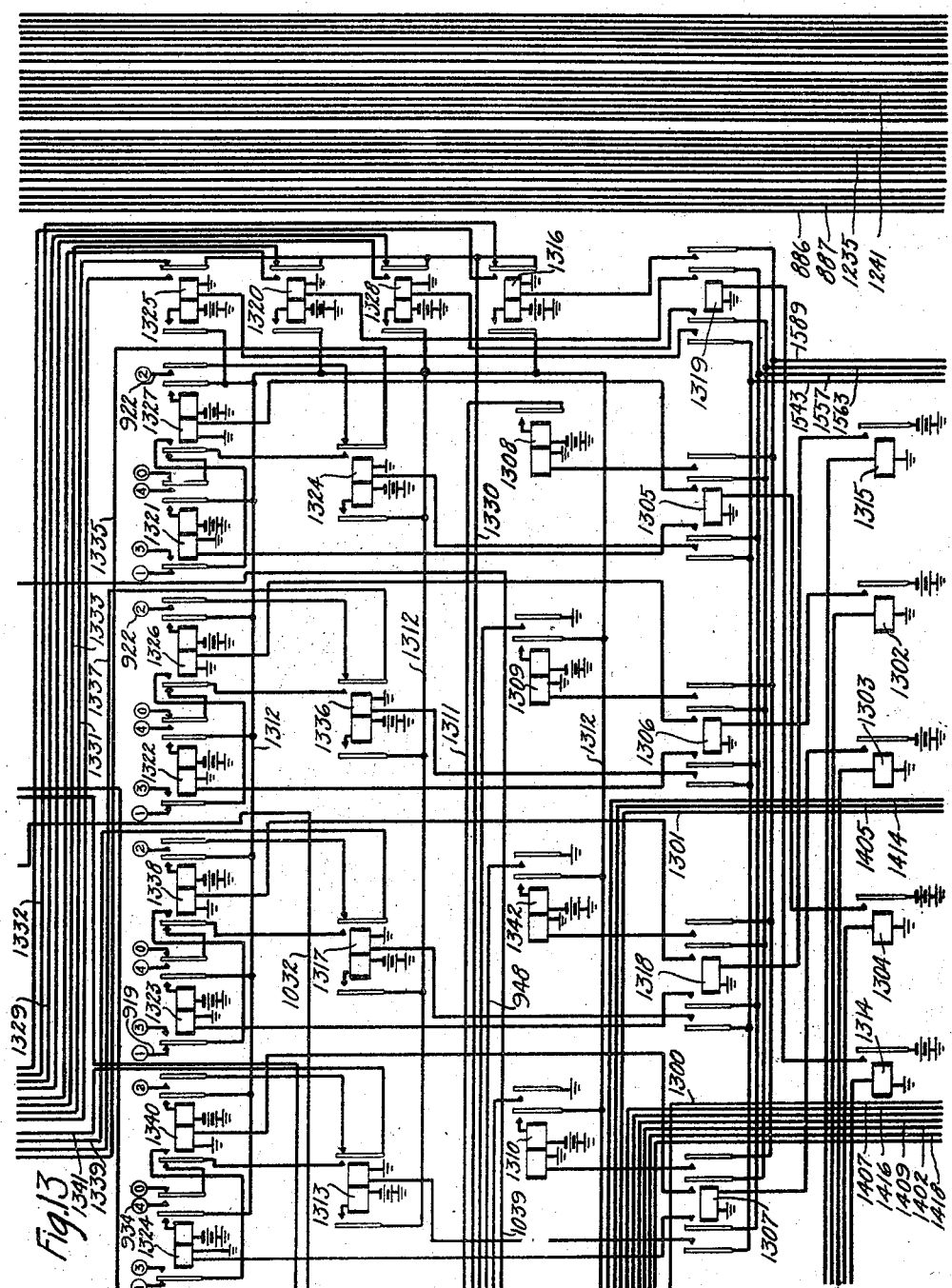
Fig. 13 shows another set of registers for receiving the record as translated.
Figure 14:
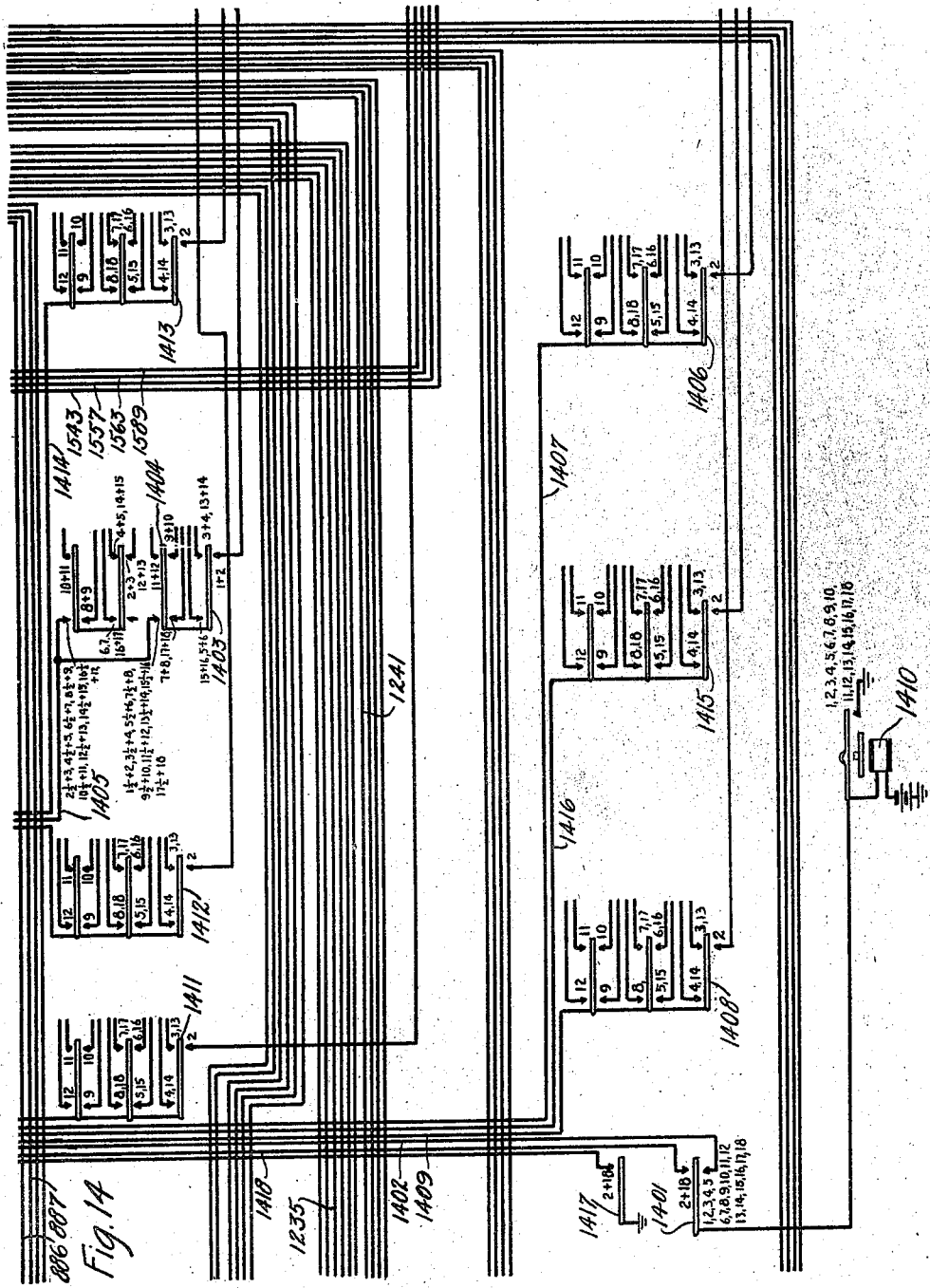
Fig. 14 shows one of a plurality of connecting switches by means of which the translator is connected with the sender.

When the register relays of Fig. 13 have been set, the translator is released, the class switch 1200 is positioned and selections are completed in the usual manner. If the distant office is a manual office, code relay call indicator pulses are transmitted to indicate to the operator at station Z' the number of the wanted subscriber.

*Detailed description.*

Assume that the subscriber at substation 100 located at office X desires to talk to a subscriber at substation 380 located at office Z which may be reached only through the tandem office Y. The subscriber dials the number of the wanted line. The line 100 will be extended, as briefly set forth above, to office Y. For a description of the registration of the wanted number on the sender and the action of said sender in controlling the extension to the wanted line, reference may be made to United States Patent 1,395,977 to F. A. Stearn et al., granted November 1, 1921, and for a description of the method of sending code pulses reference may be made to Patent 1,464,084, to A. E. Lundell et al., issued August 7, 1923.

When office selector 103 selects a trunk leading to an idle district selector at the tandem office, which it is assumed is district selector 200, a relay (not shown) at sender 104 will be bridged across trunk conductors 249 and 250 completing a circuit for relay 201 which may be traced from battery at the outer left back contact of relay 234, left winding of relay 201, lower left contact of cam 203, upper back contact of relay 202, over trunk conductor 249, through office selector 103, and district selector 102, through the above mentioned relay in the sender 104, back through district selector 102 and office selector 103, trunk conductor 250, inner lower back contact of relay 202, lower right contact of cam 204, right winding of relay 201, inner right back contact of relay 234 to ground. The operation of relay 201 closes a circuit from battery through the winding of relay 205, lower right contact of cam 206, outer left back contact of relay 207, lower contacts of cam 208, front contact of relay 201 to ground.

Allotter switches 410 and 450 are so arranged that when one stands in a position from 1 to 10, the other stands in position 17. Let it be assumed for this description that allotter 410 is in position 1. Therefore, when relay 205 operates it closes a circuit from ground at its inner left front contact, over the upper right and lower left contacts of cam 209, conductor 405, contact of key 404, left back contact of relay 403, left back contact of relay 401, right contact of cam 406, winding of relay 400 to battery. Relay 400 closes a circuit from battery through non-inductive resistance 407, winding of relay 408, outer contact of relay 400 to ground. Relay 408 operates and closes a circuit from battery through the winding of relay 503, left back contact of relay 502, contact of jack 501, conductor 411, left contact of cam 409, contact of relay 408 to ground. Relay 503 in operating locks over its inner right contact, right back contact of relay 502, conductor 504 to ground at the inner contact of relay 400.

Relay 503 in operating also closes a circuit from battery, through the winding of relay 505, inner left contact of relay 503 to ground. The circuits closed by the operation of relay 505 will be discussed later. Relay 503 closes a circuit extending from battery through the non-inductive resistance 407, middle contact of relay 400, conductor 506, middle right contact of relay 503, conductor 507, left back contact of relay 412 to ground. This circuit shunts the winding of relay 408 and permits that relay to release, thus opening the energizing circuit of relay 503. A circuit is also closed from battery through the winding of start magnet 510, back contact of magnet 511, outer left contact of relay 503 to ground. The power driven switch 500 is rotated under the control of magnet 510 until brush 512 engages the terminal connected to the district selector 200 which terminal is connected with ground, thus closing a circuit from battery, through the winding of relay 508, and from battery through the winding of stop magnet 511 and back contact of relay 518, in parallel, over the outer right contact of relay 503, brush 512, and the terminal corresponding to selector 200, conductor 509, lower contacts of cam 212, outer left front contact of relay 205, right contact of cam 213 to ground.

It will be noted that in the case of a district selector which has not been selected for use relay 205 will not be operated and the path from ground will not be extended to a terminal associated with brush 512. Relay 508 and magnet 511 operate in the above traced circuit, magnet 511 serving to open the circuit of magnet 510, bringing the switch 500 to rest on the terminals leading to selector 200. Relay 508 closes a circuit from battery through the winding of relay 518, outer right front contact of relay 508 to ground. Relay 518 operates and closes a locking circuit for itself over its inner right contact, left winding of relay 519, brush 513 to conductor 528, from whence the circuit is extended to ground as will be subsequently described. Relay 518 also closes an obvious circuit for relay 502, closes a holding circuit for magnet 511 at its inner left alternate contact, and closes a new holding circuit for relay 503 which extends over the inner right contact of relay 503, inner right front contact of relay 508, outer left front contact of relay 518, outer left front contact of relay 503 to ground.

The operation of relay 502, opens the first traced locking circuit for relay 503, closes a holding circuit for relay 505 at its middle right contact, and closes a circuit from battery through the left winding of relay 207, upper left and lower right contacts of cam 214, conductor 529, brush 514 and its corresponding terminal, left front contact of relay 502, left contact of relay 508, to ground. Relay 207 operates and locks over its outer left front contact, lower contacts of cam 208, to ground at the front contact of relay 201. The operation of relay 207 opens the circuit of relay 205 which relay releases opening the circuit of relay 400. Relay 207 also connects ground from the front contact of relay 201, lower contacts of cam 208, right front contact of relay 207, lower contacts of cam 215, non-inductive resistance 216, conductor 528, completing the locking circuit of relay 518 which was previously traced to conductor 528. Relay 519 being marginal does not operate through resistance 216.

Relay 207 also closes a circuit from battery through the winding of sequence switch magnet 210, upper right contact of cam 217, inner left front contact of relay 207, upper left and lower right contacts of cam 218, back contact of relay 205, right contact of cam 213 to ground, advancing sequence switch 210 to position 3.

In position 2 of sequence switch 210 the locking circuit of relay 518 is extended over the upper right contact of cam 219 to ground, where it is maintained until sequence switch 210 leaves position 13. The release of relay 205 as previously described also removes ground from conductor 509, thus opening the circuit for relay 508.

The release of relay 508 opens the locking circuit of relay 503 and that relay also releases. When sequence switch 210 reaches position 3, the circuit of relay 201 is extended from battery, outer left back contact of relay 234, left winding of relay 201, right contacts of cam 218, left back contact of relay 205, left contacts of cam 203, conductor 249, and thence as previously traced to conductor 250, left contacts of cam 204, right back contact of relay 205, right winding of relay 201, right contact of relay 234 to ground, so that relay 201 is maintained energized.

In the meantime the operation of relay 505 as previously described closes a circuit from battery through the winding of relay 530, right back contact of relay 531, outer right front contact of relay 505 to ground. Relay 530 operates and locks over its right front contact, back contact of magnet 521, outer right contact of relay 505 to ground, It also closes a circuit from battery through the winding of allotter magnet 410, left contact of cam 413, conductor 532, contact of jack 501, left front contact of relay 505 to ground, advancing allotter 410 to position 2 in which position it is ready to allot another link circuit for use in connection with a subsequent call.

The operation of relay 530 closes a circuit from battery through the winding of relay 531, inner left front contact of relay 530 to ground at the outer right front contact of relay 505. Relay 531 closes a circuit from battery through the magnet 520 which controls the operation of switch 550, outer right front contact of relay 531, right front contact of relay 530, back contact of magnet 521, outer right front contact of relay 505 to ground. It also opens the energizing circuit of relay 530. Switch 550 is then rotated under the control of magnet 520 until it engages an idle sender which is characterized by battery through a resistance on conductor 601. When an idle sender is reached a circuit is closed from battery, inner back contact of relay 701, resistance 700, conductor 601, terminal served by brush 522, corresponding to the idle sender, inner right contact of relay 505, both windings of relay 533, winding of relay 534, outer right contact of relay 505 to ground. Relay 533 operates and short circuits its high resistance winding permitting marginal relay 534 to operate. The operation of relay 534 closes a circuit from battery through stop magnet 521, contact of relay 534, outer right contact of relay 505 to ground.

Magnet 521 operates and opens the locking circuit of relay 530 and the energizing circuit for magnet 520. Relay 530 and magnet 520 release. Relay 530 on releasing closes a holding circuit for maget 521 over the inner left front contact of relay 531, right back contact of relay 530, outer right contact of relay 505 to ground. The release of relay 530 also connects ground from the outer right contact of relay 505, inner left back contact of relay 530, middle left front contact of relay 531, inner right front contact of relay 505 to conductor 601 in shunt of the windings of relays 533 and 534 so that these relays release. With relays 530 and 508 released and relays 502 and 531 operated a circuit is closed from battery through the winding of relay 535, outer right front contact of relay 502, outer left back contact of relay 530, outer left contact of relay 531, right back contact of relay 508 to ground. Relay 535 in operating extends the fundamental tip and ring conductors and certain control conductors from the district selector to the sender. It also closes a circuit from ground through resistance 536, brush 523 and its corresponding contact, conductor 602, left winding of relay 603, outer left back contact of relay 701, winding of relay 702 to battery. Relay 702 operates, but relay 603 being marginal does not. Relay 702 locks to its energizing circuit independent of the contact of relay 701.

It also closes an obvious energizing circuit for relay 701 which in operating, removes battery from conductor 601 to mark the sender busy to other link circuits. The operation of relay 535 also closes a circuit from battery, through the winding of relay 205, lower contacts of cam 214, conductor 529, brush 514 and the terminal served thereby, left winding of relay 519, inner left contact of relay 535, brush 524 and its corresponding contact, right winding of relay 603, left back contact of relay 604, right back contact of relay 703, outer left front contact of relay 702 to ground. Relays 519 and 603 being differential the completion of this circuit does not cause the operation of either relay. Relay 205 operates and connects the trunk conductors 249 and 250 through to the pulsing relays of the sender, disconnecting it from the windings of relay 201. This relay releases and releases relay 207.

Relay 702 in operating, also closes a circuit from battery, through the winding of relay 605, No. 1 terminal and brush 614 of timing switch 600, left back contact of relay 606, conductor 607, lower right contact of cam 1000, lower left contact of cam 1001, conductor 1002, outer right contact of relay 702 to ground. Relay 605 operates and locks to its energizing circuit independent of the timing switch. The operation of relay 605 initiates a timing operation which will be more completely described later.

*Registration of call by relay call indicator pulses.*

A pulsing circuit extends from sender 104 through the district and office selectors, conductor 249, left contacts of cam 203, outer left front contact of relay 205, lower right contact of cam 212, upper right contact of cam 221, conductor 538, brush 516, middle right contact of relay 535, brush 526, conductor 619, inner left back contact of relay 703, right back contact of relay 704, winding of marginal relay 705, winding of negatively polarized relay 706, winding of positively polarized relay 707, inner left back contact of relay 704, left contacts of cam 900, conductor 618, brush 525, inner right contact of relay 535, brush 515, conductor 537, upper contacts of cam 220, outer right front contact of relay 205, left contacts of cam 204, conductor 250 and thence through the office and district selectors to the sender 104.

The completion of this circuit, due to the operation of relay 205, initiates certain operations at the sender 104 which result in the transmission of code impulses to correspond to the number of the wanted line. For a description of these operations, reference may be made to the above mentioned Patent No. 1,464,084 to A. E. Lundell et al., issued August 7, 1923.

As previously indicated relay 705 being marginal responds only to heavy impulses, relay 706 responds only to negative pulses and relay 707 responds only to positive pulses. Assume that the number of the wanted subscriber is CHElsea 5678. The code impulses which will be transmitted to correspond to this designation are as follows:

C (2) { heavy negative
        light negative
H (4) { light negative
        light positive
        light negative
E (3) { light positive
        heavy negative
        light negative
5     { light negative
        heavy negative
6     { light positive
        light negative
        heavy negative
7     { heavy negative
        heavy negative
8     { light positive
        heavy negative
        heavy negative The first impulse over the above traced pulsing circuit causes the operation of relays 705 and 706. The operation of relay 706 closes a circuit from battery through the left winding of relay 709, winding of relay 708, left back contact of relay 709, contact of relay 706, conductor 730, lower left contact of cam 1003, conductor 888, to ground at the outer left front contact of relay 702. Relay 708 operates in this circuit, but the current through the right winding of relay 709 is not sufficient to cause that relay to operate. The operation of relay 708 closes a locking circuit for that relay extending from battery, through the left winding of relay 709, winding of relay 708, right winding of relay 709, inner left front contact of relay 708 to grounded conductor 730. Relay 709 does not operate in this locking circuit since its right energizing winding is shunted by the energizing circuit of relay 708.

Relay 708 in operating also closes a circuit from battery through the winding of relay 710, left back contact of relay 711, outer left contact of relay 708, to ground on conductor 730. Relay 710 operates and closes a locking circuit for itself through the winding of relay 711, inner right front contact of relay 710 to grounded conductor 730. Relay 711 does not operate in this locking circuit, being shunted by the energizing circuit of relay 710. The operation of relay 705 closes a circuit from battery, through the winding of relay 802, conductor 805, inner right back contact of relay 711, conductor 731, right back contact of relay 709, front contact of relay 705 to ground. Relay 802 operates and locks over its right contact, conductor 888, outer left front contact of relay 702 to ground. When this impulse ceases, the circuit of relays 706 and 705 is opened and relay 706 opens at its contact the energizing circuit of relay 708, permitting relay 709 to operate in the locking circuit of relay 708.

When the next impulse is received, only relay 706 is operated. Relay 706 closes at its front contact a circuit through the left holding winding and left front contact of relay 709, front contact of relay 706, to grounded conductor 730. This circuit is in shunt of the winding of relay 708 and releases that relay. With relay 708 released the original energizing circuit for relay 710 is opened, but a substitute circuit is already closed at the inner right contact of relay 709.

Since relay 705 is not operated, none of the relays of the register 800 is operated in response to this impulse. At the end of the impulse relay 706 releases, releasing relay 709 which in turn opens the energizing circuit of relay 710 and permits relay 711 to operate in the locking circuit of relay 710. This completes the reception of the tandem hundreds digit resulting in the operation of relay 802.

The first impulse of the group corresponding to the tandem tens digit is a light negative impulse and causes the operation of relay 706 alone. Relay 706 causes the operation and locking of relay 708 in the manner previously described. Relay 708 in operating closes a circuit from battery through the winding of relay 712, left back contact of relay 713, inner left front contact of relay 711, outer left front contact of relay 708 to grounded conductor 730. Relay 712 operates and locks through the winding of relay 713 to grounded conductor 730. At the end of the first pulse, relay 706 releases and relay 709 operates in the locking circuit of relay 708. The next pulse being a light positive pulse causes the operation of relay 707 which in turn closes a circuit from battery through the winding of relay 813, conductor 815, right back contact of relay 714, outer right front contact of relay 712, conductor 733, right front contact of relay 708, contact of relay 707 to grounded conductor 730. Relay 813 operates and locks over its right front contact to grounded conductor 888.

In response to the next impulse, relay 706 alone is operated, causing by its operation the release of relay 708, and at its release, the release of relay 709 and the operation of relay 713 in the locking circuit of relay 712. Relay 813 is the only relay of tandem tens register 810 to be operated.

In response to the first impulse of the next digit relay 707 is operated, completing a circuit from battery, through the right winding of relay 821, conductor 825, left back contact of relay 714, left front contacts of relay 712 and 710, conductor 732, right back contact of relay 708, front contact of relay 707 to grounded conductor 730. Relay 821 operates and locks to grounded conductor 888.

In response to the second impulse, relays 706 and 705 are operated, relay 706 causing the operation of relay 708 as previously described and relay 708 causing the operation of relay 714. Relay 705, in operating, closes a circuit from battery through the right winding of relay 822, conductor 826, inner right back contact of relay 715, inner right front contacts of relays 713 and 711, conductor 731, right back contact of relay 709, contact of relay 705 to ground. At the completion of the impulse, relays 706 and 705 deenergize.

In response to the next impulse relay 706 alone is operated, shunting relay 708 and at the completion of the pulse, releasing relay 708 and permitting relay 715 to operate in the locking circuit of relay 714.

The next digit to be transmitted is the stations digit but since there is no party designation to the number of the called subscriber, only two light negative pulses will be transmitted so that relays 708 and 709 will perform their cycle to cause the operation and locking of the transfer relays 716 and 717 corresponding to the stations digit, to direct the next set of pulses to the thousands register.

Due to the next group of impulses, corresponding to the thousands digit, relays 708 and 709 will perform the cycle of operations previously described, causing the operation and locking of relays 718 and 719 in the manner of the other transfer relays. Since the second negative pulse is heavy, relay 705 will be operated at this time. Relay 709 will be operated as well as relay 718. Therefore, the circuit closed by relay 705 extends from ground at its contact, over the outer right front contact of relay 709, conductor 734, outer left front contact of relays 711, 713, 715 and 717, outer right back contact of relay 719, conductor 846, left winding of relay 844 to battery. Relay 844 operates and locks to conductor 888.

In response to the pulses corresponding to the next or hundreds digit relays 708 and 709 perform their cycle in response to the two negative pulses, likewise causing the operation and locking of relays 720 and 721 in the manner of the other transfer relays. The positive pulse causes the operation of relay 707 to complete a circuit from grounded conductor 730 over the front contact of relay 707, right back contact of relay 708, conductor 732, left front contacts of relays 710, 712, 714, 716 and 718, left back contact of relay 720, conductor 856, left winding of relay 851, to battery. Relay 851 operates and locks to grounded conductor 888. Since the second negative impulse is heavy, relay 705 will be operated at this time to close a circuit from ground at its front contact, outer right front contact of relay 709, conductor 734, outer left front contact of relays 711, 713, 715, 717 and 719, outer right back contact of relay 721, conductor 855, left winding of relay 854 to battery. Relay 854 locks to conductor 888.

In response to the pulses constituting the next or tens digit, relays 709 and 708 perform their cycle and relays 722 and 723 are operated and locked. Since both negative pulses are heavy, relay 705 will be operated, first, to close a circuit from ground at its front contact over the right back contact of relay 709, conductor 731, inner right front contact of relays 711, 713, 715, 717, 719 and 721, inner right back contact of relay 723, conductor 865, left winding of relay 862, to battery and the second time to close a circuit from ground at its front contact, over the outer right front contact of relay 709, conductor 734, outer left front contact of relays 711, 713, 715, 717, 719 and 721, outer right back contact of relay 723, conductor 866, left winding of relay 864, to battery. Relays 862 and 864 lock to grounded conductor 888.

When the next group or units pulses are received, relays 708 and 709 perform their cycle in response to the two negative pulses. In response to the positive pulse, relay 707 is operated, closing a circuit from grounded conductor 730, contact of relay 707, right back contact of relay 708, conductor 732, left front contact of relays 710, 712, 714, 716, 718, 720 and 722, conductor 875, left winding of relay 871 to battery. In response to the heavy negative impulses, relay 705 is operated, in the first case to close a circuit from ground at its front contact, over the right back contact of relay 709, conductor 731, inner right front contact of relays 711, 713, 715, 717, 719, 721 and 723, conductor 876, left winding of relay 872 to battery, and in the second case to close a circuit from ground over the outer right front contact of relay 709, conductor 734, outer left front contact of relays 711, 713, 715, 717, 719, 721, 723, conductor 877, left winding of relay 874, to battery. Relays 871, 872 and 874 operate and lock to conductor 888.

To summarize, the following is a table showing the relays of each register operated as just described:

| Register. | Relays operated. |
|---|---|
| 800 | 802 |
| 810 | 813 |
| 820 | 821<br>822 |
| 830 | ---- |
| 840 | 844 |
| 850 | 851<br>854 |
| 860 | 862<br>864 |
| 870 | 871<br>872<br>874 |

When relay 709 releases after the last digit has been received, relay 704 operates in the locking circuit of relay 724. The operation of relay 704 opens the pulsing circuit preventing the reception of any further possible false pulses. It also closes a circuit from battery through the winding of relay 703, outer right front contact of relay 704 to ground. Relay 703 operates and locks to ground at the outer left front contact of relay 702. Relay 703 connects ground through interrupter 725 to conductor 621.

The operation of relay 703 also opens the pulsing circuit at another point. It also disconnects ground from the right windings of relays 603 and 519, opening the circuit of relay 205 so that relay 205 releases. The release of relay 205 reconnects relay 201 to the trunk conductors 249 and 250. Relay 201 reoperates and closes a circuit from battery through the winding of relay 222, left contact of cam 206, outer left back contact of relay 207, lower contacts of cam 208, to ground at the contact of relay 201. Relay 222 closes a locking circuit for itself over its left front contact, lower contacts of cam 223 to ground at the contact of relay 201 independent of relay 207. A temporary locking circuit exists over the left contacts of cam 223 to insure relay 222 remaining operated as sequence switch 210 passes from position 3 to position 4. The operation of relay 222 also closes a circuit from battery through the sequence switch magnet 210, lower left contact of cam 224, inner left back contact of relay 207, front contact of relay 222 to ground, advancing sequence switch 210 to position 4.

*Setting secondary office registers.*

In the meantime, when relay 716 operates during the reception of pulses, a circuit is closed from battery through sequence switch magnet 1010, lower right contact of cam 1004, outer left contact of relay 1005, outer left front contact of relay 716 to ground, advancing sequence switch 1010 to position 2. With sequence switch 1010 in position 1¾ to 2, the following circuits are completed: from battery, winding of sequence switch magnet 1100, upper left contact of cam 1101, conductor 1130, left back contact of relay 804, conductor 880, lower left contact of cam 1006 to ground; from battery through the winding of magnet 1100, upper right contact of cam 1102, conductor 1131, left back contact of relay 801, outer left front contact of relay 802, left back contact of relay 803, conductor 880 to ground; battery, winding of sequence switch magnet 1110, upper right contact of cam 1111, conductor 1133, left back contact of relay 814 to grounded conductor 880; battery through the winding of magnet 1110, lower right contact of cam 1111, conductor 1132, outer left front contact of relay 813, to grounded conductor 880; battery, through the winding of sequence switch magnet 1120, lower right contact of cam 1121, conductor 1134, left back contact of relay 824 to grounded conductor 880; battery through the winding of magnet 1120, lower right contact of cam 1122, conductor 1135, outer left front contact of relay 821, outer left front contact of relay 822, left back contact of relay 823 to grounded conductor 880.

An examination of the cuttings of the control cams for these sequence switches will show that these are the only circuits completed at this time. The sequence switch 1100 comes to rest in either of the positions 2 or 12, sequence switch 1110 comes to rest in position 4 or 14, and sequence switch 1120 comes to position 3 or 13.

Figure 7:
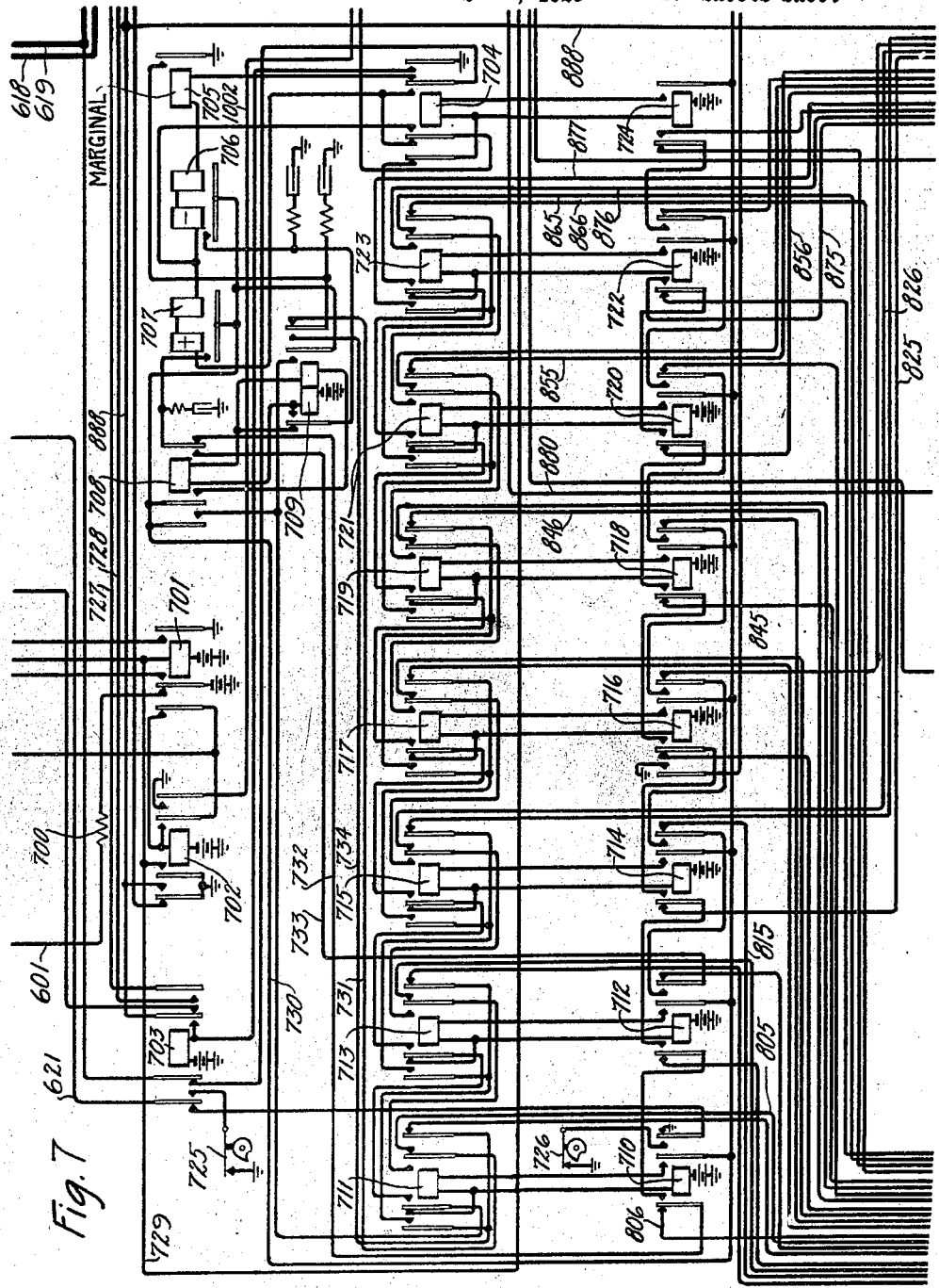
Fig. 7 shows the means for receiving code impulses from the distant office and the transfer relays for directing the registration of said impulses.

When sequence switch 1010 reaches position 2, a second locking circuit for the transfer relays of Fig. 7 and the register relays of Fig. 8 is closed at the lower right contact of cam 1003. At the same time sequence switches 1100, 1110 and 1120 were operated, relays 1103, 1113 and 1123 were operated in parallel with the sequence switches. When the sequence switches have come to rest, the circuits of these relays are opened and these relays release, to close a circuit from ground at the contact of relay 1103, contact of relay 1113, contact of relay 1123, conductor 1136, lower left contact of cam 1004, winding of sequence switch magnet 1010 to battery, advancing the sequence switch to position 4.

*Selection and setting of translator.*

Four groups of translator circuits are provided, two for what are known as "letter office codes" and two for numerical office codes. Each sender is provided with a finder circuit similar to the finder of Fig. 14 for each of the groups of these translators. Letter office codes are those dialed by the subscriber directly and do not include either of the digits 1 or 0 except for the special codes 211, 311, 411, 511, 611, 711, 811 and 911. The numerical office codes which are those used by operators include the digits 1 and 0, so that at least one of the sequence switches 1100, 1110 and 1120 will be set in 1 or 0.

In order to reach a maximum number of routes two groups of translators are provided, as mentioned above, for each type of code. With switch 1100 set in positions 2, 3, 7, 9, 12, 13 or 17, relay 1007 will be operated to start finder 1410 hunting for an idle translator in the group serving routes represented by initial digits 2, 3, 7 or 9. With switch 1100 in positions 4, 5, 6, 8, 14, 15, 16 or 18, relay 1011 is operated to start a finder the same as 1410 which has access to the group of translators serving routes represented by the initial digits 4, 5, 6 and 8. With one of the sequence switches 1100, 1110 or 1120 set in position 1 or 11, relay 1012 will be operated to start the corresponding translator finder, while with one of these switches set in position 10, relay 1013 will be operated to start the corresponding translator finder.

Since sequence switch 1100 is assumed to be in position 2, relay 1007 will be operated in a circuit including the lower contact of cam 1104, outer left back contact of relay 1008, lower right and upper left contacts of cam 1009, right back contact of relay 1005 to ground, which is closed as soon as sequence switch 1010 reaches position 3½. The rectangle 1050 represents the finder switches which have access to the other groups of translators.

It will be noted that the operating circuits for relays 1007 and 1011, which are operated when a letter code is registered, extend over the back contact of relay 1008. When a numerical code is registered, that is, when sequence switch 1100 is in position 10 or 11 and either of the switches 1110 or 1120 are in position 1, 10 or 11 but not both of them, a circuit is closed for relay 1008 over the contacts of cam 1108, 1117 or 1125, conductor 1138 to ground at the lower right contact of cam 1006. Relay 1008 in operating opens the circuit of relay 1007 and 1011 and closes the circuit of relays 1013 and 1012 which correspond to numerical codes.

The operation of relay 1007 as previously described closes a circuit from battery through the winding of finder sequence switch magnet 1410, lower contact of cam 1401, conductor 1402, front contact of relay 1007, back contact of relay 1014, upper right contact of cam 1015 to ground. Sequence switch 1410 is then operated to advance from position to position in search of an idle translator. When an idle translator is found, that is, one whose sequence switch is standing in position 1, say translator 1500, a circuit will be completed from battery, through the winding of relay 1501, resistance 1502, left contact of cam 1503, contact 1505 of jack 1504, lower contact of cam 1403, upper left contact of cam 1404, conductor 1405, inner left contact of relay 1005, both windings of relay 1016, winding of relay 1014, to ground. Relays 1501 and 1016 operate in this circuit, relay 1016 shortcircuiting its high resistance winding to permit the operation of relay 1014. The operation of relay 1014 opens the circuit of magnet 1410 and permits the sequence switch to come to rest in position 2. The operation of relay 1014 also closes a circuit from battery through the winding of sequence switch magnet 1010, lower right contact of cam 1017, front contact or relay 1014, upper right contact of cam 1015 to ground, advancing the sequence switch to position 5.

If the finder switches of two senders should start hunting at the same time and connect with the same translator at the same instant, relay 1016 would operate, but there would still be insufficient current to operate relay 1014 due to the connection of the second finder switch with the translator. Since relay 1014 did not operate, the circuit for switch 1410 would be maintained and would cause the advance of the switch to the next translator, the effect being the same as though a busy translator had been encountered. If the two finders should again connect to the same translator, the same operation would take place and would continue until the two finders step out of synchronism. Should this be unduly delayed, a time alarm switch would be operated.

The operation of relay 1501 as previously described closes an obvious circuit for relay 1506, which prepares a locking circuit for itself over its inner right contact, right contact of cam 1503, contact 1505 of jack 1504 and thence as previously traced through the windings of relays 1016 and 1014 to ground. This locking circuit is completed as soon as sequence switch 1510 reaches position 2.

When sequence switch 1010 reaches position 4¾, a holding circuit is provided for relay 1506 of the translator extending from inner left back contact of relay 1005, to ground at the lower left contact of cam 1015, in shunt of relays 1016 and 1014 so that these relays release.

With sequence switch 1010 in position 5 and relay 1506 operated, a fundamental circuit is established from battery through the winding of relay 1507, left contact of relay 1506, upper right contact of cam 1508, lower contact of cam 1408, conductor 1409, conductor 1018, lower left contact of cam 1019, conductor 1020, lower contact of cam 901, back contact of relay 902, winding of relay 903, through the winding of either relay 904 or 905 and contact of cam 1201 dependent on the position in which class sequence switch 1200 is standing due to the last call, contact of cam 1021, lower contact of cam 906, resistance 907 to ground. Assuming that sequence switch 1200 was left standing in position 3, the above traced circuit will extend through the winding of relay 905 and over the right contact of cam 1201.

Relays 905 and 1507 operate in this circuit, but relay 903 being polarized does not receive current of the right direction to cause its operation. Relay 1507 operates and locks over its right contact, lower left contact of cam 1509, to the fundamental circuit as traced. The operation of relay 1507 also closes a circuit from battery through the winding of sequence switch magnet 1510, upper right contact of cam 1511, left front contact of relay 1507 to ground, advancing sequence switch 1510 to position 2. In position 2 the energizing circuit of relay 1507 is opened but the locking circuit remains closed. In this position a circuit is closed from battery through the winding of high speed updrive magnet 1512, right contact of cam 1513, left front contact of relay 1507 to ground.

Relay 905 in operating closes a circuit from battery at the left front contact of relay 701, conductor 622, winding of the No. 0 counting relay, back contact of relay 914, conductor 913 (Figs. 9 and 11), lower contact of cam 1106, right contact of cam 1114, lower left contact of cam 1022, right back contact of relay 1008, lower right and upper left contacts of cam 1001, conductor 1023, upper contacts of cam 909, front contact of relay 905, upper left contact of cam 911 to ground. The No. 0 counting relay operates and locks through the windings of relays 902 and 915 in parallel, front contact of the No. 0 counting relay, conductor 917, upper right contact of cam 1024 to ground. Relays 902 and 915 do not operate being shunted by the energizing circuit of the No. 0 counting relay.

The translator brush rod is driven upward under the control of magnet 1512 in a brush selecting movement. When brush 1514 encounters the first conducting segment of commutator strip 1583, a circuit is completed from battery through the right winding and right front contact of relay 1507, upper contact of cam 1509, strip 1583, brush 1514 to ground, which holds relay 1507 operated and which shunts the winding of stepping relay 905, causing that relay to release and open the energizing circuit of the No. 0 counting relay.

Relays 902 and 915 now operate in the locking circuit of that relay. Relay 902 in operating opens the fundamental circuit causing the release of relay 1507 when brush 1514 leaves the conducting segment of strip 1583. Relay 915 closes a circuit from battery through the winding of sequence switch magnet 1010, upper contact of cam 1025, conductor 1026, inner right back contact of relay 918, front contact of relay 915 to ground, advancing sequence switch 1010 to position 7. As sequence switch 1010 moves from position 5 to position 7, the locking circuit for the No. 0 counting relay is opened and that relay releases as do relays 902 and 915.

When relay 1507 releases, it opens the circuit of the updrive magnet bringing the translator to rest in position to trip the first pair of brush sets. It also closes a circuit from battery through the winding of magnet 1510, lower right contact of cam 1511, back contact of relay 1507 to ground, advancing sequence switch 1510 to position 3.

With sequence switch 1010 in position 7 and switch 1510 in position 3, the fundamental circuit is again closed as previously described, causing the operation of relays 1507 and 905. Relay 1507 locks as before and advances sequence switch 1510 to position 4. In positions 3 to 5, the circuit of trip magnet 1515 is closed over the lower contacts of cam 1516. With relay 1507 operated and sequence switch 1510 in position 4, the circuit of the updrive magnet is again closed.

With sequence switch 1010 in position 7, the operation of relay 905 closes a circuit from battery, at the left front contact of relay 701, through the winding of the No. 3 counting relay, over the back contact of the No. 3′ counting relay to conductor 908 (Figs. 9 and 11), lower contact of cam 1115, lower right contact of cam 1107, conductor 1137, lower left contact of cam 1022, right back contact of relay 1008 and thence as previously described through the front contact of relay 905 to ground at the cam 911. The No. 3 counting relay operates and locks through the winding of the No. 3′ counting relay, conductor 912, lower right contact of cam 1024 to ground.

As the translator 1500 is driven upwards the operation of relay 1515 causes the tripping of the desired sets of brushes. An intermittent circuit is also closed through the winding of relay 1507 and its right front contact, left contact of cam 1509, left contact of cam 1508, commutator strip 1517, brush 1518 to ground. Each time that brush 1518 engages a conducting segment of strip 1517, relay 1507 is held operated while relay 905 is released to open the energizing circuit of the counting relays and permit the prime counting relay to operate in the locking circuit thereof. When brush 1518 encounters the first conducting segment of strip 1517, the No. 3′ counting relay operates and locks in the circuit of the No. 3 counting relay. When relay 905 reoperates at the time that brush 1518 encounters an insulating segment of strip 1517, the circuit previously traced through the winding of the No. 3 counting relay extends over the front contact of the No. 3′ counting relay, back contact of the No. 2′ counting relay to the winding of the No. 2 counting relay which operates and locks. The second conducting segment of strip 1517 causes the operation of the No. 2′ counting relay in the locking circuit of the No. 2 counting relay. Similarly the next operation of relay 905 causes the operation of the No. 1 counting relay and the next conducting segment causes the operation of the No. 1′ counting relay. The next operation of relay 905 causes the operation of the No. 0 counting relay and the next or fourth conducting segment causes the operation of relays 902 and 915 in the locking circuit of the No. 0 counting relay in the manner described for brush selection. The operation of relay 902 as before opens the fundamental circuit and permits relay 1507 to release. The operation of relay 915 closes the same circuit for sequence switch magnet 1010 as that which advanced it from position 5 to position 7 for the purpose of advancing it to position 9. As before, the counting relays release when sequence switch 1010 leaves position 7.

The release of relay 1507 advances sequence switch 1510 to position 5 in the same manner as it advanced it to position 3. It also opens the energizing circuit of updrive magnet 1512, bringing translator 1500 to rest in position to select within the fourth group.

With sequence switch 1010 in position 9 and switch 1510 in position 5, the fundamental circuit is again established, operating relays 1507 and 905. Relay 1507 locks as before and advances sequence switch 1510 to position 6. In this position the operation of relay 1507 closes a circuit for low speed updrive magnet 1519. As the selector moves upward an intermittent circuit is closed through the winding of relay 1507 and its right front contact, upper contact of cam 1509, strip 1583, brush 1514 to ground. The operation of relay 905 at this time closes a circuit from battery through the winding of the No. 1 counting relay, back contact of the No. 1' counting relay, conductor 919 (Figs. 9 and 11), upper left contact of cam 1124, upper contact of cam 1022 and thence as previously traced through the front contact of relay 905 to ground at cam 911.

Each time that brush 1514 encounters a conducting segment of strip 1583, relay 1507 is held and relay 905 shunted, causing the operation of the counting relays as previously described. When two conducting segments have been encountered, relays 902 and 915 operate in the locking circuit of the No. 0 counting relay as previously described. Relay 902 opens the fundamental circuit, releasing relay 1507, and 915 advances sequence switch 1010 to position 11 in the manner previously described.

The release of relay 1507 advances sequence switch 1510 to position 7 and also opens the circuit of the low speed updrive magnet, bringing the translator to rest on the second set of terminals in the fourth group served by the first pair of brush sets.

When sequence switch 1010 reaches position 10, a circuit is closed from battery through the winding of relay 1027, lower left contact of cam 1024 to ground. The operation of relay 1027 connects the register control relays of Fig. 13 with the translator 1500. As soon as sequence switch 1510 arrives in position 7, a circuit is completed through the winding of relay 1507, over the upper right and lower left contacts of cam 1516 to ground, in which circuit it operates and locks over its right front contact, lower right contact of cam 1509, outer right front contact of relay 1506 to ground. At its left front contact it closes a circuit for sequence switch 1510 over the upper right contact of cam 1511, advancing that sequence switch to position 8, in which position the translator brushes are connected through to the conductors extending to the register control relays.

*Setting of tertiary registers.*

Figure 10:
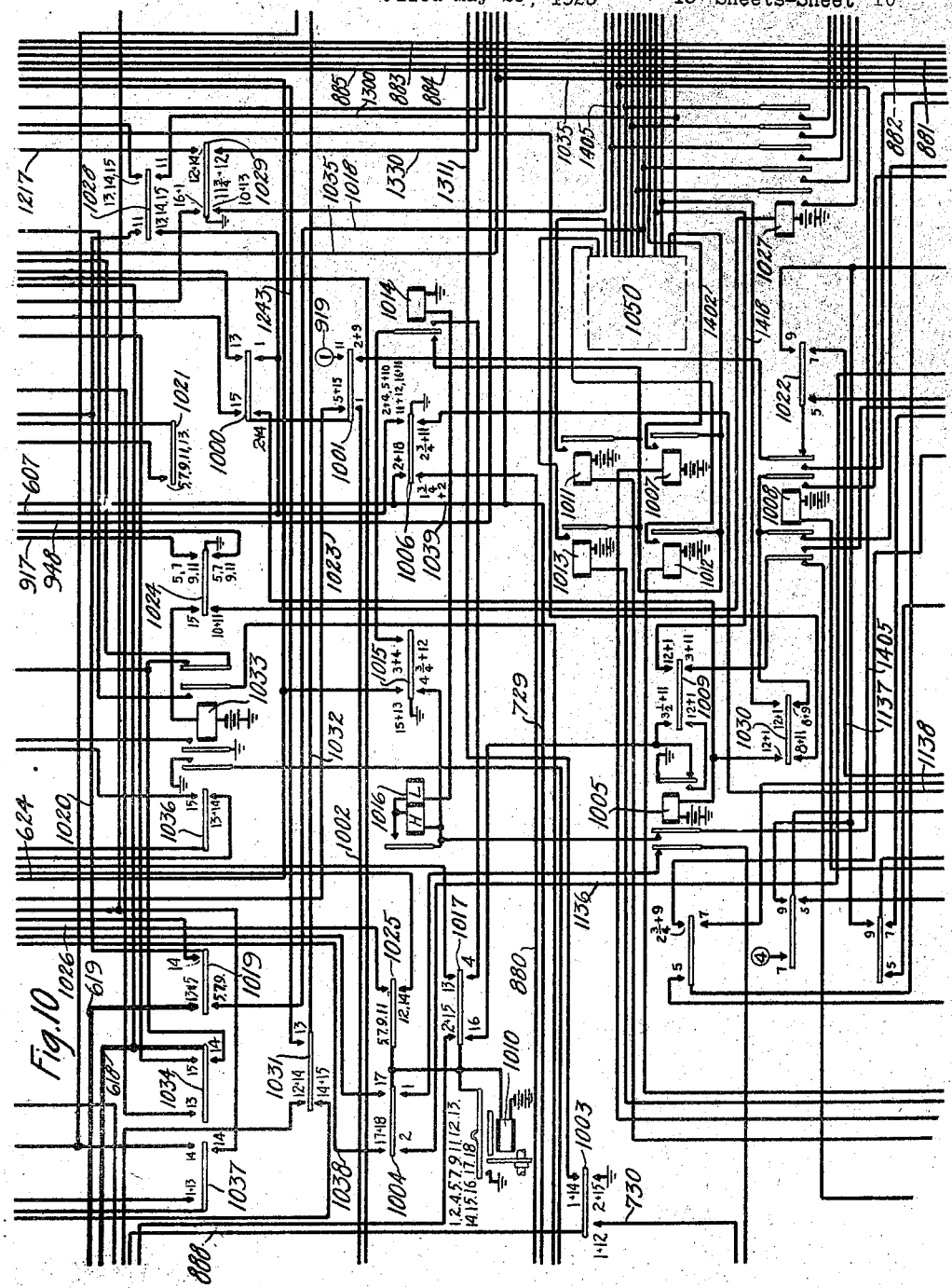
Fig. 10 shows a sequence switch and apparatus for controlling the selection and setting of the translator.

With sequence switch 1010 in position 11 and switch 1510 in position 8, a circuit is prepared from battery over brush 1520, feed strip 1521, conducting segment 1523 of pulse machine 1550, brush 1524, contact of cam 1529, conductor 1522, lower contact of finder cam 1411, conductor 1300, lower right and upper left contacts of cam 1028, lower contact of cam 901, back contact of relay 902, winding of relay 903, winding of relay 905, right contact of cam 1201, contact of cam 1021, lower contact of cam 906, resistance 907 to ground. This circuit is completed as soon as brush 1524 engages segment 1523, at which time relay 905 operates. Relay 905 operates in this circuit and closes a circuit from battery through the No. 1 counting relay, back contact of the No. 1' counting relay, conductor 919 (Figs. 9 and 10), upper contacts of cam 1001, conductor 1023, upper contacts of cam 909, front contact of relay 905, upper left contact of cam 911 to ground. The No. 1 counting relay operates and locks through the winding of the No. 1' counting relay, conductor 912, lower right contact of cam 1024 to ground. When brush 1524 leaves segment 1523 the circuit of relay 905 is opened and the No. 1' counting relay operates in the locking circuit of the No. 1 counting relay. The purpose of this circuit is to insure that a complete revolution of the drum 1550 takes place before the translator is disconnected from the registers of Fig. 13. The circuit is reclosed at the completion of a revolution to operate the No. 0 counting relay and is opened to permit the operation of relays 902 and 915. The effect of the operation of these relays will be set forth later.

Figure 15:
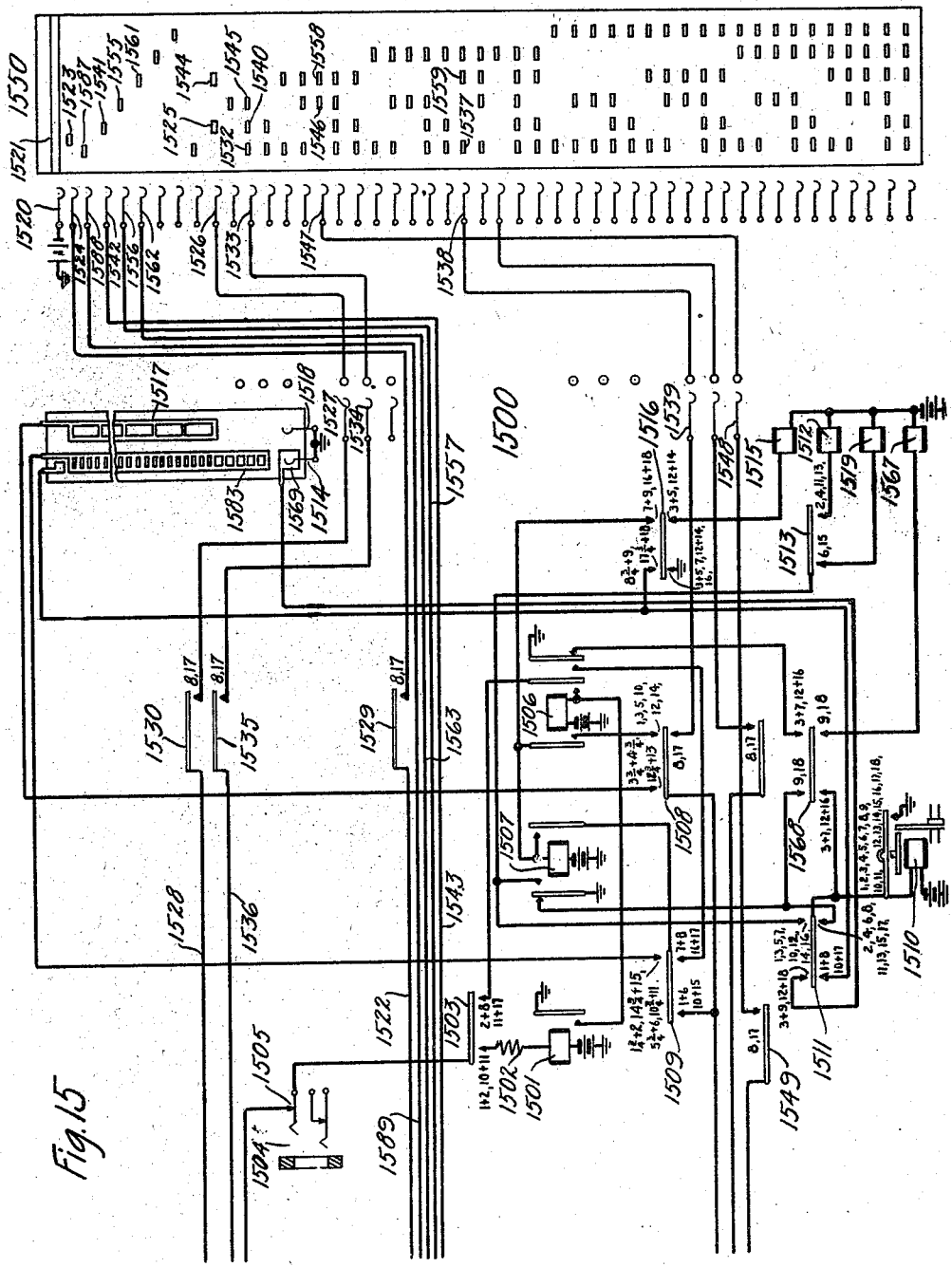
Fig. 15 shows a translator and impulse machine.

Assume that when the sequence switch 1510 moves into position 8, the brushes of the pulse machine are in the position indicated in Fig. 15. The pulse machine drum is so constructed that each of the segments is connected directly with feed strip 1521 so that for simplicity it will be assumed that each segment of the drum has battery connected directly to it.

When the brushes encounter the first row of segments, the following circuits are completed: segment 1532, brush 1533, translator brush 1534, contact of cam 1535, conductor 1536, lower contact of cam 1413, conductor 1414, middle contact of relay 1027, winding of relay 1303 to ground; segment 1537, brush 1538, translator brush 1539, lower contact of cam 1508, lower contact of cam 1408, conductor 1409, next to the inner contact of relay 1027, winding of relay 1304 to ground. Relays 1303 and 1304 operate and close obvious circuits for relays 1307 and 1305. At the same time a circuit is closed from segment 1587, brush 1588, conductor 1589, and thence in parallel over the outer right contact of relay 1305, through the left winding of relay 1308 to ground, and over the outer right contact of relay 1307, left winding of relay 1310 to ground. Relays 1308 and 1310 operate. Relay 1308 locks in a circuit from battery through its right winding and contact, conductor 1311, upper right contact of cam 1003 to ground. Relay 1310 locks in a circuit from battery through its right winding and inner right front contact to conductor 1312, lower left contact of cam 1029 to ground. When the pulse machine brushes leave the first row of segments, relays 1303 and 1304 release, in turn releasing relays 1305 and 1307.

When the brushes meet the second row of segments, the following circuits are completed: segment 1525, brush 1526, translator brush 1527, contact of cam 1530, conductor 1528, lower contact of cam 1412, conductor 1301, outer contact of relay 1027, winding of relay 1315 to ground; segment 1540, brush 1533, and thence as traced in connection with the first row of segments through the winding of relay 1303 to ground. Relays 1303 and 1315 operate and close circuits for relays 1307 and 1318. At the same time a circuit is closed from segment 1541, over brush 1542, conductor 1543 and thence in parallel over the outer left front contact of relay 1318, right winding of relay 1317 to ground, and through the outer left contact of relay 1307, right winding of relay 1313 to ground. Relays 1313 and 1317 operate and lock to grounded conductor 1312. When the brushes leave the second row of segments the translator releases the relays as before.

When the pulse machine brushes engage the third row of segments, a circuit is completed from segment 1545 through brush 1533 as previously described to cause the operation of relay 1303, and a second circuit is closed from battery, segment 1546, brush 1547, translator brush 1548, contact of cam 1549, lower contact of cam 1406, conductor 1407, next to the outer contact of relay 1027, winding of relay 1302 to ground. Relays 1302 and 1303 operate and close obvious circuits for relays 1306 and 1307. As before, a circuit is closed through segment 1555, brush 1556, conductor 1557, and thence in parallel over the inner left front contact of relay 1306, left winding of relay 1322 to ground, and over the inner left contact of relay 1307, left winding of relay 1324 to ground. Relays 1322 and 1324 operate and lock to grounded conductor 1312.

As the brushes leave the third row of segments, the control relays release and when the brushes engage the fourth row of segments circuits are completed from segment 1558, over brush 1547 to operate relay 1302; from segment 1559, over brush 1538 as before to operate relay 1304, and from segment 1544 to brush 1526 to operate relay 1315 as before. Relays 1302, 1304 and 1315 close obvious circuits for relays 1305, 1306 and 1318. A circuit is also closed from battery at segment 1561 over brush 1562, conductor 1563, and thence in parallel over the inner right contact of relay 1305, left winding of relay 1327 to ground, over the inner right contact of relay 1306, left winding of relay 1326 to ground, and over the inner right contact of relay 1318, left winding of relay 1338 to ground. Relays 1326, 1327 and 1338 operate and lock to conductor 1312. The fifth and sixth rows of segments are ineffective since no circuits are provided over the contacts of the control relays in these positions.

When brush 1524 breaks contact with segment 1523 as previously described and relays 902 and 915 operate, relay 915 closes a circuit from battery through the winding of sequence switch magnet 1010, upper right contact of cam 1025, conductor 1026, inner right back contact of relay 918, front contact of relay 915 to ground, advancing the sequence switch to position 12. As soon as sequence switch 1010 leaves position 11 the circuit of relay 1027 is opened and that relay releases, disconnecting the translator from the registers of Fig. 13. The operation of relay 902 opens the circuit of relay 905 and when sequence switch 1010 leaves position 11, this circuit is also opened at cam 1028. In advancing from position 11 sequence switch 1010 opens the locking circuit of the No. 0 counting relay so that relays 902 and 915 release. The advance of sequence switch 1010 from position 11 also opens the circuit of relay 1007, releasing that relay.

*Release of the translator.*

With sequence switch 1010 in position 12, a circuit is completed from battery through the winding of relay 1005, upper contacts of cam 1030, contact of cam 1417, to ground. The operation of relay 1005 closes a circuit from battery through the winding of sequence switch magnet 1410, upper contact of cam 1401, conductor 1418, upper right and lower left contacts of cam 1009, right front contact of relay 1005 to ground. Sequence switch 1410 is restored to normal in this circuit. As soon as sequence switch 1410 reaches position 1, the above traced circuit for relay 1005 is opened and that relay releases.

The operation of relay 1005 also opens the holding circuit of relay 1506, permitting that relay to release. With relay 1506 released, the locking circuit of relay 1507 is opened and that relay releases in turn. When relay 1507 closes its back contact it advances sequence switch 1510 to position 9. In this position a circuit is closed through the winding of downdrive magnet 1567, over the lower right and upper left contacts of cam 1568 to ground at the back contact of relay 1507. Under the control of magnet 1567, translator 1500 is restored to normal, whereupon a circuit is completed from ground over brush 1514, commutator segment 1569, upper left contact of cam 1511, winding of sequence switch magnet 1510 to battery, advancing the sequence switch to position 10 which is its second normal position. The circuit accomplishes its cycle of operations twice during one revolution of the sequence switch.

The setting of the class register relays 1316, 1328, 1320 and 1325 determine the setting of class switch 1200, which not only sets up the conditions for properly completing the call, but controls the selection of the resistance to be included in the fundamental test circuit and the stepping relay to be employed. Since none of the class relays were operated, the following circuits are closed for advancing switch 1200 to the desired position, which in this case, that of a full mechanical call over a low resistance fundamental loop, is position 8. It will be remembered that it was assumed that sequence switch 1200 had been left in position 3 from a previous call. Switch 1200 is advanced from position 3 in a circuit from battery through the winding of magnet 1200, upper left contact of cam 1204, conductor 1331, back contact of relay 1325, conductor 1330, lower right contact of cam 1029 to ground, thus advancing sequence switch 1200 to position 4. In position 4 a path is completed over the lower left contact of cam 1203, conductor 1332, back contact of relay 1316, to grounded conductor 1330.

In position 5 a circuit extends over the upper left contact of cam 1204, conductor 1331, back contact of relay 1325, to grounded conductor 1330. In position 6 the path is the same as that traced in position 4. In position 7 the path extends over the upper left contact of cam 1203, conductor 1329, back contact of relay 1328, to grounded conductor 1330. In position 8 no circuit is completed and sequence switch 1200 comes to rest in position 8. Relay 1202 is energized in parallel with sequence switch 1200 and releases when the switch comes to rest to close a circuit from ground over its back contact, conductor 1032, upper left contact of cam 1031, conductor 728, outer right front contact of relay 703, conductor 727, lower left contact of cam 920, winding of sequence switch magnet 910 to battery, advancing this sequence switch to position 2.

With sequence switch 910 in position 2, a circuit is completed from battery through the winding of sequence switch magnet 1010, lower right contact of cam 1025, lower left contact of cam 921, to ground, advancing sequence switch 1010 to position 13. As sequence switch 1010 leaves position 12, the locking circuit of the transfer relays of Fig. 7 is opened.

*District selections.*

With sequence switch 1010 in position 13 and sequence switch 910 in position 2, the fundamental circuit is completed from battery through the left winding of relay 207, lower left and upper right contacts of cam 221, conductor 538, brush 516, middle right contact of relay 535, brush 526, conductor 619, upper left contact of cam 1019, conductor 1020, lower contact of cam 901, back contact of relay 902, winding of relay 903, winding of relay 904, lower left contact of cam 1201 (switch 1200 now in position 8), contact of cam 1021, lower contact of cam 906, resistance 907 to ground. Relays 904 and 207 operate in this circuit.

Relay 207 locks over its outer left front contact, upper left contact of cam 212, upper right contact of cam 221, to conductor 538 and thence over the fundamental circuit as traced to ground. The operation of relay 207 closes a circuit from battery through the winding of sequence switch magnet 210, upper right contact of cam 217, inner left front contact of relay 207, front contact of relay 222 to ground. Sequence switch 210 advances in this circuit to position 5. In position 5 the energizing circuit of relay 207 is opened but the locking circuit is maintained closed. A circuit is completed for updrive magnet 225 over the upper right and lower left contacts of cam 226, inner left front contact of relay 207, contact of relay 222 to ground. As the brush rod moves upward an intermittent circuit is completed from battery, left winding of relay 207, outer left front contact of relay 207, upper left contact of cam 212, upper right contact of cam 221, lower left and upper right contacts of cam 227, commutator strip 228, brush 229, lower left contact of cam 219 to ground.

Relay 904 closes a circuit from battery at the left front contact of relay 701, conductor 622, winding of the No. 2 counting relay, back contact of the No. 2′ counting relay, conductor 922 (Figs. 9 and 13), outer right contact of relay 1327, back contact of relay 1334, conductor 1335, upper right and lower left contacts of cam 950, upper right contact of cam 1000, upper left contact of cam 1001, upper right and lower left contacts of cam 909, front contact of relay 904, lower left contact of cam 911 to ground.

The No. 2 counting relay operates in this circuit and locks through the winding of the No. 2' counting relay, front contact of the No. 2 counting relay, upper right contact of cam 925, to ground. The No. 2' counting relay cannot operate at this time since it is shunted by the energizing circuit of the No. 2 counting relay.

The first time that the intermittent circuit previously traced is completed it holds relay 207 operated and shunts the winding of relay 904 to cause that relay to release. The release of relay 904 permits the operation of the No. 2' counting relay in the locking circuit of the No. 2 counting relay. When brush 229 engages an insulating segment of strip 228, relay 904 operates and the counting relay circuit is extended from conductor 922, front contact of the No. 2' counting relay, back contact of the No. 1' counting relay to the winding of the No. 1 counting relay. As brush 229 passes over the next conducting segment, the No. 1' counting relay is permitted to energize in the locking circuit of the No. 1 counting relay and the No. 0 counting relay is operated. On the engagement of the third conducting segment, relays 902 and 915 operate in the locking circuit of the No. 0 counting relay, relay 902 serving to open the fundamental circuit permitting the release of relay 207, relay 915 closing a circuit from battery through the winding of sequence switch magnet 910, upper right contact of cam 924, inner right back contact of relay 918, front contact of relay 915 to ground, advancing the sequence switch to position 4. In passing from position 2 to position 4, sequence switch 910 opens the locking circuit of the counting relays and they release.

The release of relay 207 opens the circuit of up-drive magnet 225, bringing the selector 200 to rest in position to trip the third set of brushes. Relay 207 in releasing closes a circuit from battery through the winding of sequence switch magnet 210, lower left contact of cam 224, inner left back contact of relay 207, contact of relay 222 to ground, advancing the sequence switch to position 6.

When sequence switch 210 is in position 6 and sequence switch 910 in position 4, the fundamental circuit is again established. Relay 207 operates and locks as above and advances sequence switch 210 to position 7, in which position the energizing circuit of relay 207 is opened but the locking circuit is maintained. As soon as sequence switch 210 reaches position 6, a circuit is completed through trip magnet 230, lower right contact of cam 219 to ground. In position 7 the circuit of updrive magnet 225 is again established over the upper right and lower left contacts of cam 226, inner left front contact of relay 207 to ground at the front contact of relay 222.

Relay 904 in operating closes a circuit from battery over the left front contact of relay 701, conductor 622, through the winding of the No. 2 counting relay, back contact of the No. 2' counting relay, conductor 922 (Figs. 9 and 13), outer right front contact of relay 1326, back contact of relay 1336, conductor 1337, left contacts of cam 950, upper right contact of cam 1000, upper left contact of cam 1001, conductor 1023, upper contacts of cam 909, front contact of relay 904, upper left contact of cam 911 to ground.

An intermittent circuit is completed through the left winding of relay 207, outer left front contact of relay 207, upper contacts of cam 212, commutator strip 231, brush 232, lower left contact of cam 219 to ground. As before, this circuit is completed each time that brush 232 encounters a conducting segment of strip 231 to operate and lock the Nos. 2 and 2' counting relays, the Nos. 1 and 1' counting relays, the No. 0 counting relay and relays 902 and 915. When, therefore, the third conducting segment has been encountered, relays 915 and 902 operate, relay 902 opening the fundamental circuit to release relay 207 and relay 915 operating to advance sequence switch 910 to position 5.

The release of relay 207 opens the circuit of updrive magnet 225, bringing the switch to rest with the brushes opposite the first terminals of the desired group of outgoing trunks. At its inner left back contact relay 207 closes a circuit for advancing sequence switch 210 to position 8. With sequence switch 210 in position 8, relay 207 is operated in a local circuit extending from battery, through its right winding, lower contacts of cam 233, inner left back contact of relay 234, front contact of relay 222 to ground. Relay 207 operates and locks in a circuit from battery, through its left winding and outer left and right front contacts, lower left and upper right contacts of cam 215, to sleeve brush 235, provided that the first trunk of the group is busy.

The operation of relay 207 also closes a circuit from battery through the winding of sequence switch magnet 210, upper right contact of cam 217, inner left front contact of relay 207, to ground at the front contact of relay 222, advancing sequence switch 210 to position 9. If the first trunk of the group is idle, relay 207 releases immediately that the sequence switch leaves position 8¼. Should the first trunk be busy, however, relay 207 is held operated to close a circuit through updrive magnet 225 extending over the upper right and lower left contacts of cam 226, inner left front contact of relay 207, front contact of relay 222 to ground. Switch 200 will be advanced under the control of the updrive magnet in search of an idle trunk. Relay 207 is maintained energized between terminals by means of a circuit through its right winding, lower left and upper right contacts of cam 233, centering commutator strip 286, brush 287, left contacts of cam 226, inner left front contact of relay 207 to ground at the front contact of relay 222.

When brush 235 encounters an idle outgoing trunk relay 207 is released as soon as its brushes are properly centered and the holding circuit through the centering strip 286 is broken. As soon as relay 207 releases, the circuit of updrive magnet 225 is opened, and a circuit is completed from battery through the winding of sequence switch magnet 210, lower left contact of cam 224, inner left back contact of relay 207 to ground at the front contact of relay 222 to advance the sequence switch to position 10. As soon as relay 207 releases, it connects ground from the upper right contact of cam 206 over its outer left back contact, right contacts of cam 208, to the sleeve brush 235 to mark the terminal busy. When sequence switch 210 arrives in position 10, ground is connected to brush 235 over the upper contacts of cam 208, independent of relay 207.

In position 10 of sequence switch 210, direct ground from relay 222 over the left contacts of cam 218 is connected in shunt of the ground through resistance 216 to conductor 528, and thence over brush 513, through the left winding of relay 519, front contact and winding of relay 518 to battery. Relay 519 now receives sufficient current to cause it to operate. It connects direct ground from its front contact over brush 523, conductor 602, left winding of relay 603 to the front contact and winding of relay 702. Relay 603 now receives sufficient current to cause it to operate and it closes a circuit from battery through the winding of sequence switch magnet 910, lower left contact of cam 924, front contact of relay 603 to ground, advancing sequence switch 910 to position 6.

Figure 1:
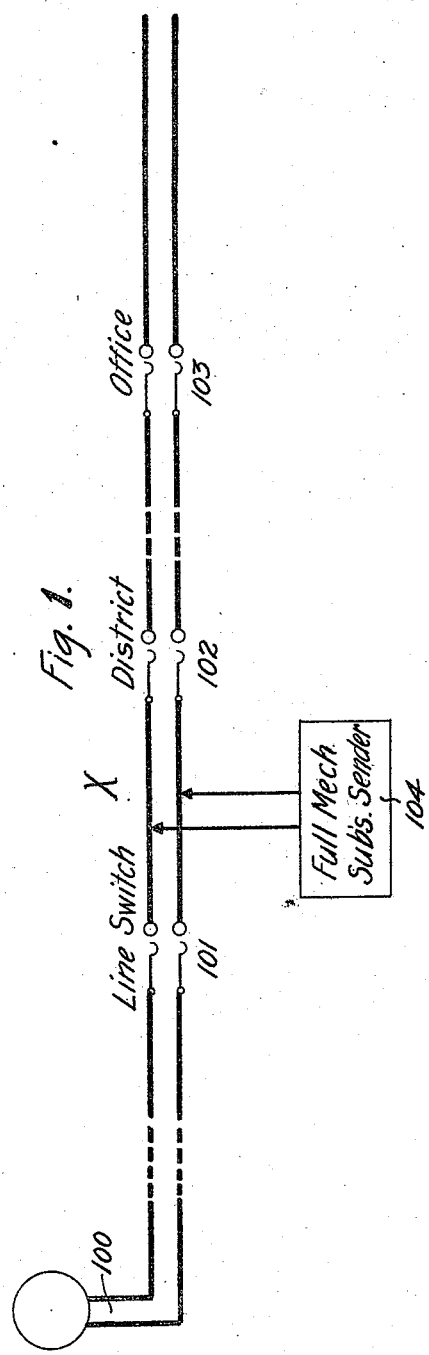
Figure 2:
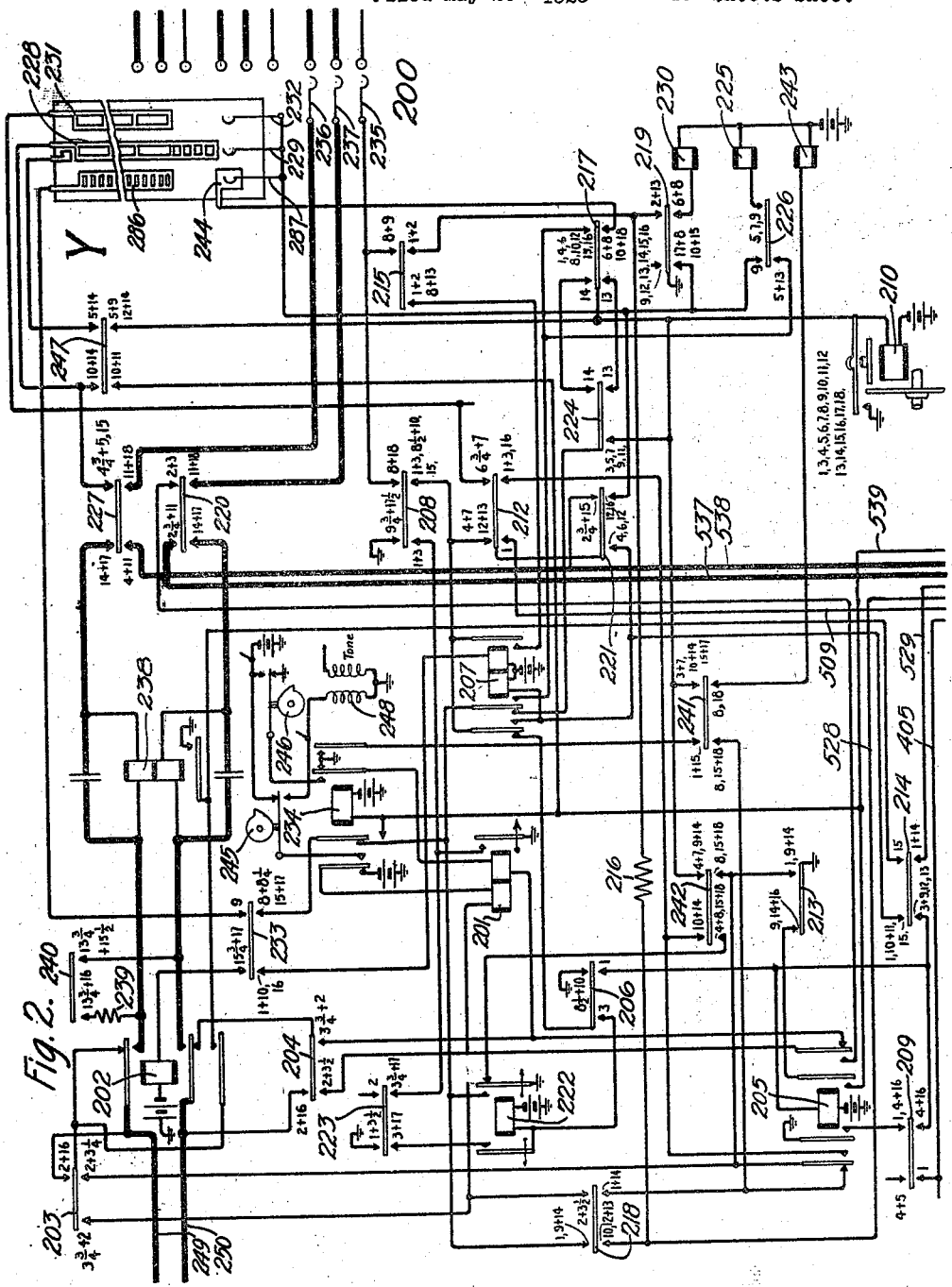
Fig. 2 shows a district selector at a tandem office.
Figure 3:
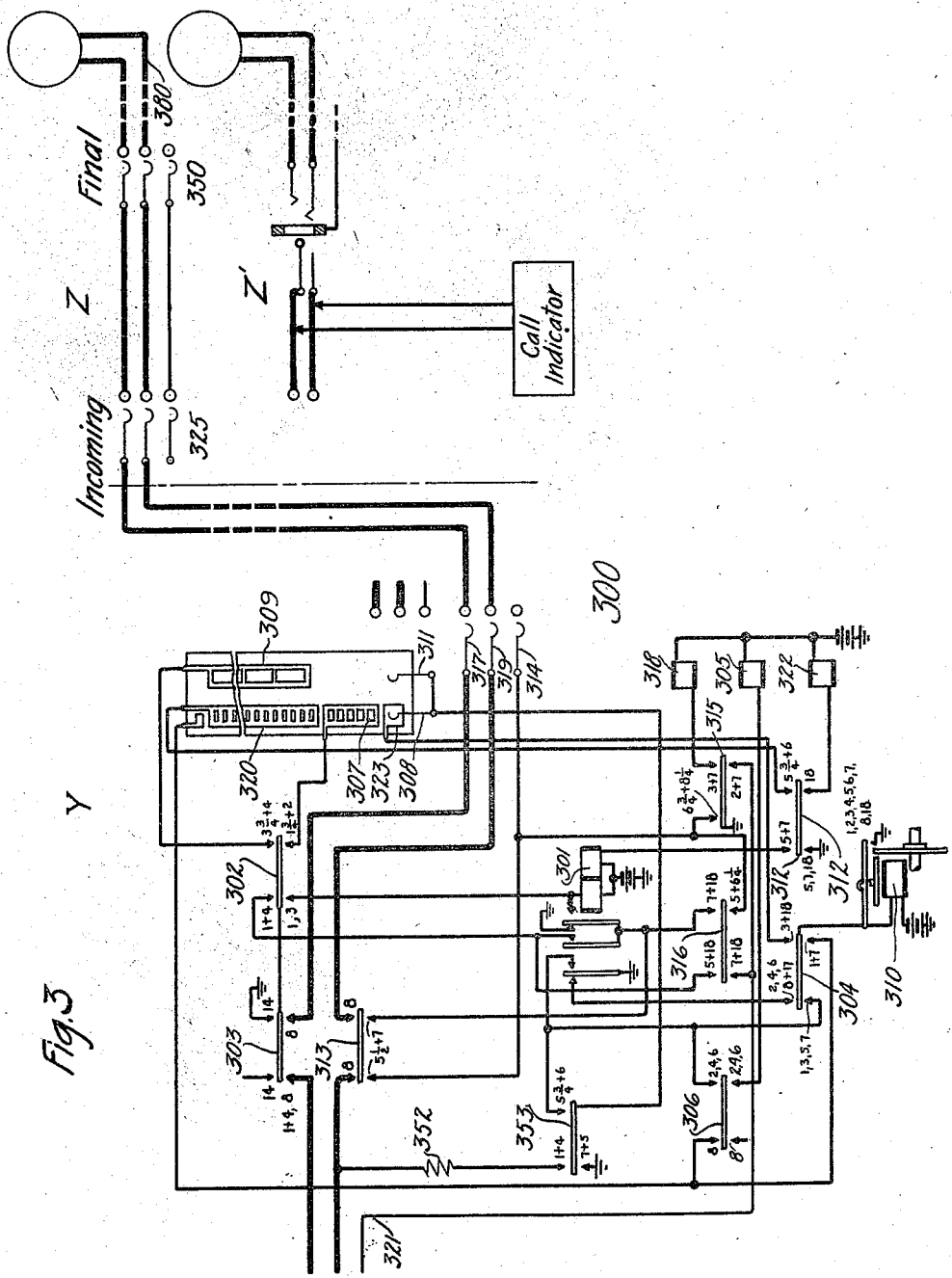
Fig. 3 shows an outgoing selector at the tandem office, the incoming and final selector at a third office and call indicator apparatus at still another office.

With sequence switch 910 in position 6, a circuit is closed from battery through the left winding of relay 207, upper left and lower right contacts of cam 214, conductor 529, brush 514, right winding of relay 519, inner left contact of relay 535, brush 524, right winding of relay 603, back contact of relay 604, back contact of relay 623, lower left contact of cam 925 to ground. Relay 207 operates in this circuit and closes a circuit from battery through magnet 210, upper right contact of cam 217, inner left front contact of relay 207, front contact of relay 222 to ground, advancing the sequence switch to position 11. In this position subsequent selections take place and the fundamental circuit from the sender is connected through to the outgoing selector of Fig. 3. When sequence switch 210 leaves position 10 the direct ground is removed from conductor 529, leaving only the ground through resistance 216. Since relay 519 is differential, the circuit just traced for relay 207 now causes relay 519 to release. The release of relay 519 removes direct ground from the winding of relay 603 so that, since relay 603 is also differentially wound, the above traced circuit for relay 207 causes the release of relay 603 as well.

*Office selections.*

The fundamental circuit is now closed for testing the office selector. A circuit is closed from battery, through the left winding of relay 301, lower left contact of cam 302, lower left contact of cam 303, district selector brush 236, lower contacts of cam 227, conductor 538, brush 516, middle contact of relay 535, brush 526, conductor 619, upper left contact of cam 1019, conductor 1020, lower contact of cam 901, back contact of relay 902, winding of relay 903, contact of cam 1205, winding of relay 926, resistances 1206 and 1207, lower contact of cam 927, upper left and lower right contacts of cam 928, right back contact of relay 1033, lower right contact of cam 950, upper left contact of cam 900, conductor 618, brush 525, inner right contact of relay 535, brush 515, conductor 537, upper left and lower right contacts of cam 220, district selector brush 237, resistance 352, left contacts of cam 353 to ground.

If the office selector and relay 301 in that selector are in normal condition, the above traced circuit is completed and relay 926 operates but relay 301 does not. The operation of relay 926 closes an obvious circuit for relay 929, which in turn closes a circuit for relay 930. Relay 930 in operating locks through its inner right front contact, upper contact of cam 1208, lower right contact of cam 931 to ground. The operation of relay 930 closes a circuit from battery through the winding of magnet 910, lower left contact of cam 932, lower right contact of cam 1209, left front contact of relay 930, outer right back contact of relay 936, to ground, advancing sequence switch 910 to position 8. As soon as switch 910 leaves position 6, the circuit of relay 926 is opened and that relay releases, in turn releasing relay 929. The locking circuit of relay 930 is also opened, permitting that relay to release. When switch 910 reaches position 8, the fundamental circuit extends from conductor 619, upper left contact of cam 1019, conductor 1020, lower contact of cam 901, back contact of relay 902, winding of relay 903, winding of relay 904, left contact of cam 1201, left contact of cam 933, left contact of cam 1034, to conductor 618 and thence as traced to ground at cam 353. This circuit does not include resistances 1206 and 1207 and hence relay 301 operates therein. If relay 301 should operate falsely in the test circuit previously traced, it would advance sequence switch 310 to position 2 and block the reestablishment of the fundamental circuit.

The operation of relay 301 in the fundamental circuit traced in position 8 of sequence switch 910 closes a circuit from battery, through the winding of magnet 310, lower left contact of cam 304, outer left front contact of relay 301 to ground, advancing the sequence switch to position 2. The energizing circuit of relay 301 is opened at this time but a locking circuit extending over its inner and middle left front contact, and the upper left contact of cam 302 (closed while sequence switch 310 is still in position 1) is maintained in position 2 holding relay 301 operated. With sequence switch 310 in position 2, a circuit is closed from battery, through the winding of updrive magnet 305, right contacts of cam 306, outer left front contact of relay 301 to ground, advancing the selector 300 in its brush selecting operation.

Relay 904 also operates in this fundamental circuit and closes a circuit from battery, at the left front contact of relay 701, conductor 622, winding of the No. 1 counting relay, back contact of the No. 1' counting relay, conductor 919 (Figs. 9 and 13), left back contact of relay 1323, left front contact of relay 1338, right front contact of relay 1317, conductor 1339, lower right contact of cam 900, lower left contact of cam 950, upper right contact of cam 1000, upper left contact of cam 1001, conductor 1023, upper contacts of cam 909, front contact of relay 904, upper left contact of cam 911 to ground. As selector 300 moves upward a circuit is intermittently closed through the left winding of relay 301, inner and middle left front contacts of relay 301, upper left and lower right contacts of cam 302, commutator strip 307, brush 308, lower contact of cam 303 to ground. This circuit serves to hold relay 301 operated and to shunt relay 904 causing that relay to release. This results in the operation and locking of successive pairs of counting relays.

Since the No. 1 counting relay was the first to be energized, after brush 308 leaves the second conducting segment of strip 307, relays 902 and 915 are operated and lock and relay 301 releases. The operation of relay 915 closes a circuit from battery, through the winding of sequence switch 910, upper right contact of cam 924, inner right back contact of relay 918, front contact of relay 915 to ground, advancing that sequence switch to position 10 and releasing the counting relays. As sequence switch 910 reaches position 9, a circuit is closed from battery through the winding of relay 914, upper contact of cam 923, front contact of relay 1310 to ground, causing relay 914 to operate.

The release of relay 301 opens the circuit of updrive magnet 305, bringing the switch to rest in position to trip the second set of brushes. It also closes a circuit from battery, winding of sequence switch magnet 310, upper left contact of cam 304, outer left back contact of relay 301 to ground, advancing sequence switch 310 to position 3. As soon as the sequence switch reaches position 3, a circuit is established for trip magnet 318 over the upper right contact of cam 315 to ground, so that when switch 300 is again moved upward, the desired set of brushes will be tripped.

With switch 910 in position 10 and switch 310 in position 3, the fundamental circuit is again established as described and relays 301 and 904 operate as before. Relay 301 locks and closes the previously traced circuit for advancing sequence switch 310 to position 4. In position 4 the locking circuit of relay 301 is maintained and the previously traced circuit for updrive magnet 305 is reestablished. Relay 904 in operating closes the usual counting relay circuit extending this time through the No. 4 counting relay, over the back contact of the No. 4' counting relay to conductor 934 (Figs. 9 and 13), outer right front contact of relay 1324, left back contact of relay 1340, right front contact of relay 1313, conductor 1341, upper right contact of cam 900 and thence as previously traced over the front contact of relay 904 to ground at cam 911. As switch 300 moves upward brush 311 completes an intermittent circuit through the left winding of relay 301 and its inner and middle front contacts, upper contacts of cam 302, commutator strip 309, brush 311, lower contact of cam 353 to ground. The first four conducting segments of strip 309 cause the operation and locking of the No. 4 pair of counting relays, the No. 3 pair of counting relays, the No. 2 pair of counting relays and the No. 1 pair of counting relays. The fifth energization of relay 904, instead of operating counting relay No. 0, due to the operated condition of relay 914, extends the counting relay circuit over the front contact of the No. 1' counting relay, conductor 913 (Fig. 9), right front contact of relay 914, back contact of the No. 9' counting relay through the winding of the No. 9 counting relay to battery. The next four conducting segments cause the operation of the Nos. 8, 7, 6 and 5 pairs of counting relays.

The energization of relay 905 then extends the counting relay circuit from ground over the front contact of the No. 5' counting relay, front contact of relay 914, through the winding of the No. 0 counting relay to battery. The tenth shunting and release of relay 904 causes the operation of relays 915 and 902 in the locking circuit of the No. 0 counting relay. Relay 902 as before opens the fundamental circuit, permitting the relay 301 to release as soon as brush 311 leaves the conducting segment of strip 309. Relay 915 closes the usual circuit to advance sequence switch 910 to position 12.

Relay 301 releasing advances sequence switch 310 to position 5. In position 5 relay 301 is disconnected from the fundamental circuit and is operated in a local circuit through the right winding, right contacts of cam 312 to ground. Relay 301 locks over its inner front contact, lower contacts of cam 313 to sleeve brush 314, assuming that the first outgoing trunk of the tenth group is busy. The operation of relay 301 advances the sequence switch 310 to position 6, in which position the circuit of the updrive magnet is again closed to advance the selector 300 in search of an idle outgoing trunk. Relay 301 is held operated between terminals by means of a circuit through the right winding, upper contacts of cam 312, centering commutator strip 320, brush 308, right contact of cam 303, outer front contact of relay 301 to ground. When switch 300 encounters an idle outgoing trunk no ground will appear on the terminal engaged by brush 314 and the locking circuit of relay 301 is opened. The energizing circuit of relay 301 is opened as soon as sequence switch 310 reaches position 6 and the holding circuit is opened as soon as the brush set is properly centered. Relay 301 in releasing closes a circuit from battery through the winding of sequence switch 310, upper left contact of cam 304, outer back contact of relay 301 to ground, advancing sequence switch 310 to position 7. The release of relay 301 also opens the circuit of updrive magnet 305 so that the brushes come to rest on the selected trunk.

As soon as relay 301 releases, it connects ground over its inner back contact, lower contacts of cam 313, to brush 314 to mark the selected trunk busy to other outgoing selectors. As soon as sequence switch 310 reaches position 6¾, ground is connected to sleeve brush 314 over the left contact of cam 315, maintaining the busy condition as long as switch 310 is in use.

In position 7 relay 301 is operated through its right winding, left contacts of cam 312 to ground and locks over its inner and middle front contacts, left contacts of cam 316, sleeve conductor 321, district sleeve brush 235, upper contacts of cam 208 to ground. Relay 301 also advances sequence switch 310 to position 8. Switch 310 remains in position 8 and relay 301 remains locked throughout the progress of the call.

When switch 910 reached position 11 in passing to position 12, it closed a circuit from battery through the winding of sequence switch 1010, upper right contact of cam 1017, right contact of cam 921 to ground, advancing sequence switch 1010 to position 14. When switch 1010 leaves position 13, it removes ground from conductor 1312 releasing the register relays of Fig. 13. When switch 1010 reaches position 14, it completes an additional holding circuit for relay 207 which extends from the back contact of relay 623, over the lower contact of cam 1031, conductor 1032 to the back contact of relay 1202. This holds relay 207 operated while switch 910 passes through the first part of its second revolution.

In position 12 of switch 910, relay 926 is again connected across the outgoing trunk, the circuit extending at this time from conductor 619, upper left contact of cam 1019, conductor 1020, lower contact of cam 901, back contact of relay 902, relay 903, contact of cam 1205, winding of relay 926, resistances 1206 and 1207, lower contact of cam 927, upper left and lower right contacts of cam 928, lower contact of cam 1034 to conductor 618. If the incoming selector is in position to receive a call, relay 926 operates as before, in turn operating relays 929 and 930. Relay 930 locks over its inner right front contact, upper contact of cam 1208, lower left contact of cam 931 to ground. Relay 930 also closes a shunt around the contacts of cam 928, holding relay 926 operated until switch 910 leaves position 14. Relay 930 also closes a circuit for advancing sequence switch 910 to position 1, extending from battery through the winding of magnet 910, lower left contact of cam 932, lower right contact of cam 1209, left front contact of relay 930, outer right back contact of relay 936 to ground. When sequence switch 910 leaves position 18, relay 930 releases. Sequence switch 910 is then advanced to position 2 on its second revolution in a circuit through its winding, lower left contact of cam 920, conductor 727, outer right front contact of relay 703, conductor 728, upper left contact of cam 1031, conductor 1032, back contact of relay 1202 to ground.

With switch 910 in position 2, sequence switch 1010 is advanced to position 15, in a circuit from battery through the winding of sequence switch magnet 1010, lower contact of cam 1025, lower left contact of cam 921 to ground. When switch 1010 reaches position 15, relay 1033 is operated in a circuit through its winding, upper left contact of cam 1024 to ground. With sequence switch 910 in position 2 and switch 1010 in position 15, the fundamental circuit is established from the incoming selector at station Z over the tip brush 317 of outgoing selector 300, lower contacts of cam 303, district selector brush 236, lower contacts of cam 227, conductor 538, brush 516, middle right contact of relay 535, brush 526, conductor 619, upper left contact of cam 1019, lower contact of cam 901, back contact of relay 902, winding of relay 903, winding of relay 904, lower left contact of cam 1201, right contact of cam 933, resistance 937, upper right contact of cam 1034, conductor 618, brush 525, inner contact of relay 535, brush 515, conductor 537, upper left and lower right contacts of cam 220, district selector brush 237, upper contacts of cam 313, brush 319 of outgoing selector 300 to the incoming selector.

The stepping relay 904 functions in the same manner as for district selections. In this case the initial counting relay circuit extends from battery at the left front contact of relay 701, conductor 622, winding of the No. 0 counting relay, right back contact relay 914, conductor 913 (Figs. 9 and 8), right back contact of relay 841, left back contact of relay 842, left back contact of relay 843, conductor 881, lower contacts of cam 938, upper left contact of cam 1000, upper left contact of cam 1001, conductor 1023, upper right and lower left contacts of cam 909, front contact of relay 904, lower left contact of cam 911 to ground. When one pulse is received from the incoming selector, relays 902 and 915 operate as usual, advancing the incoming selector sequence switch and advancing sequence switch 910 to position 4.

In position 4 the fundamental circuit is again established for incoming group selection and the counting relay circuit extends from battery through the winding of the No. 3 counting relay, back contact of the No. 3' counting relay, conductor 908 (Figs. 9 and 8), outer left front contact of relay 854, outer left front contact of relay 844, conductor 882, upper right contact of cam 938, and thence as previously traced to ground at cam 911. When four pulses have been received, relays 902 and 915 operate, advancing the incoming selector and advancing sequence switch 910 to position 5. The incoming selector proceeds to hunt for an idle final selector in the well-known manner. When such a final selector has been found, the incoming selector advances and extends the fundamental circuit to the final selector. Sequence switch 910 is advanced from position 5 over a circuit through its winding and the lower left contact of cam 924, to ground on the inner left contact of relay 1033.

With sequence switch 910 in position 6, the fundamental circuit is again established from the final selector for final brush selection. In this case the counting relay circuit extends from battery through the No. 1 counting relay over the back contact of the No. 1' counting relay, conductor 919 (Figs. 9 and 8), outer right front contact of relay 851, left back contact of relay 852, left back contact of relay 853, conductor 883, upper left contact of cam 938 and thence to ground as previously traced. When sufficient impulses have been received, relays 902 and 915 operate to advance the final selector sequence switch and to advance sequence switch 910 to position 8.

In position 8 the fundamental circuit is again established, this time for final group selection. The counting relay circuit extends from battery through the No. 2 counting relay, over the back contact of the No. 2' counting relay, conductor 922, (Figs. 9 and 8), left back contact of relay 861, outer left front contact of relay 862, left back contact of relay 863, conductor 884, upper right contact of cam 939, lower left contact of cam 938 and thence as previously traced to ground. Since relay 864 of register 860 is also operated, a circuit is completed at this time from battery through the winding of relay 914, lower left contact of cam 923, right front contact of relay 1033, outer right front contact of relay 864 to ground. Hence when the Nos. 1 and 1' counting relays have been operated, the path is extended as described in previous instances over the front contact of relay 914 to the winding of the No. 9 counting relay so that eight pulses are required to satisfy the condition set up and to cause the operation of relays 902 and 915. As before, relay 902 causes the advance of the final selector and relay 915 causes the advance of sequence switch 910 to position 10.

Final units selection takes place when sequence switch 910 is in position 10, the counting relay circuit at this time extending through the No. 3 counting relay, back contact of the No. 3' counting relay, over conductor 908 (Figs. 9 and 8), outer left front contact of relay 871, outer right front contact of relay 872, back contact of relay 873, conductor 885, lower right contact of cam 939, lower left contact of cam 938, and thence as traced to ground. In this case also a circuit is completed from battery, through the winding of relay 914, upper contact of cam 923, conductor 1035, outer right front contact of relay 874, outer left contact of relay 1033 to ground, so that again the operation of the Nos. 1 and 1' counting relays extends the circuit to the No. 9 counting relay and nine pulses are required to satisfy the condition set up.

When nine pulses have been received, relays 902 and 915 operate as before and advance the final selector and advance switch 910 to position 12. The final selector proceeds to test the called line, and, assuming it to be idle, advances the incoming selector to a position in which battery is connected to the ring conductor and ground to the tip conductor, thus reversing the direction of current flow over the fundamental circuit which, in position 12 of switch 910, extends from conductor 619 over the upper left contact of cam 1019, conductor 1020, lower contact of cam 901, back contact of relay 902, winding of relay 903, winding of relay 904, left contact of cam 1201, right contact of cam 933, resistance 937, upper right contact of cam 1034, to conductor 618. The current at this time is in the direction to cause relay 903 to operate. Relay 903 closes a circuit in parallel through the windings of relays 940 and 918 to ground at its front contact. Relays 918 and 940 operate, relay 940 closing a locking circuit for the two relays over its front contact, upper left contact of cam 911 to ground.

Relay 904 also operates. With relays 918 and 904 both operated, a circuit is closed from battery through the winding of the No. 0 counting relay, lower contact of cam 941, middle left contact of relay 918, upper contacts of cam 909, front contact of relay 904, upper left contact of cam 911 to ground. The No. 0 counting relay operates and locks as usual. The closure of this circuit causes the incoming selector sequence switch to advance, opening the fundamental circuit, releasing relays 903 and 904 and permitting relays 902 and 915 to operate.

Relay 915 closes a circuit from battery through the winding of magnet 910, lower right contact of cam 924, inner right contact of relay 936, right front contact of relay 918, front contact of relay 915 to ground, advancing the sequence switch to position 13, from which position it is advanced to position 15 by means of a circuit through its winding, upper right contact of cam 932, upper contact of cam 1036, inner left contact of relay 918 to ground. Sequence switch 910 is then advanced to position 16, in a circuit through its winding, upper left contact of cam 920, back contact of relay 603 to ground.

In position 16 a local circuit is completed from battery, over the upper contact of cam 901, back contact of relay 902, windings of relays 903 and 904, left contact of cam 1201, upper contact of cam 906, resistance 907 to ground, to neutralize the effect of the reversal of current previously described.

When switch 910 reaches position 16, a circuit is completed from battery, through the winding of relay 604, lower contact of cam 1037, lower right contact of cam 911 to ground. The operation of relay 604 opens the circuit through the right windings of relays 603 and 519 and left winding of relay 207. Relay 207 releases closing a circuit from battery through the winding of magnet 210, left contact of cam 224, inner left back contact of relay 207, front contact of relay 222 to ground, advancing sequence switch 210 to position 12. With switch 210 in position 12, direct ground is connected from the front contact of relay 222 over the left contacts of cam 218 to the left winding of relay 519, causing that relay to operate. Relay 519 in operating connects direct ground to the left winding of relay 603, causing it to operate. With sequence switch 210 in position 12, relay 207 reoperates in a circuit from battery through its left winding, lower contacts of cam 221, lower left contact of cam 219 to ground. The operation of relay 207 closes the usual circuit for advancing sequence switch 210 to position 13, in which position relay 207 releases. Sequence switch 210 is advanced to position 14 in a circuit from battery, winding of magnet 210, lower left contact of cam 217, lower right contact of cam 224, inner left back contact of relay 207 to ground at the front contact of relay 222, and to position 15 in a similar circuit over the upper left contact of cam 217 and upper right contact of cam 224.

When switch 210 leaves position 13, ground is removed from conductor 528, opening the circuit through the left winding of relay 519, initiating the disconnection of the sender which will be described later.

When the called subscriber answers, battery and ground are connected to the talking conductors at the distant office operating relay 238 in a circuit extending over the tip conductor through the upper winding of relay 238, resistance 239, lower contacts of cam 240, lower winding of relay 238, and thence over the ring conductor. Relay 238 operates and closes a circuit from battery, through the left winding of relay 207, upper contacts of cam 214, front contact of relay 238 to ground. The operation of relay 207 advances sequence switch 210 to position 16. Relay 207 releases as switch 210 passes from position 15 to position 16 but reoperates in the latter position, through its right winding, lower contacts of cam 233, inner left back contact of relay 234, to ground at the front contact of relay 222. The reoperation of relay 207 advances switch 210 to position 17.

When switch 210 reaches position 15¾, a circuit is closed from battery, winding of relay 202, upper left and lower right contacts of cam 233, inner left back contact of relay 234, front contact of relay 222 to ground. Relay 202 in operating extends the talking conductors through tandem office Y to office Z. The operation of relay 202 also disconnects relay 201 from the talking conductors and closes a local circuit for holding that relay operated from battery, outer left back contact of relay 234, left winding of relay 201, left contact of cam 203, lower front contact of relay 202, front contact of relay 238 to ground. The bridged resistance 239 is maintained across the talking conductors until the sequence switch leaves position 16. Conversation takes place in position 17 of the district selector sequence switch.

*Release of the sender.*

When ground is removed from conductor 528 as previously mentioned, relay 519 releases opening the circuit through the left winding of relay 603, and the winding of relay 702. Relays 603 and 702 release. With relay 702 released a circuit is closed from battery, winding of sequence switch magnet 1010, upper left contact of cam 1017, left back contact of relay 702 to ground. This circuit advances sequence switch 1010 to position 16.

When sequence switch 1010 leaves position 15, the locking circuit of relay 703 and of registers 840, 850, 860 and 870 are opened as well as the circuit of relay 1033. A circuit is then closed from battery, winding of sequence switch magnet 910, lower right contact of cam 920, upper left contact of cam 1029 to ground, in which circuit sequence switch 910 is advanced to position 17. On reaching position 17, the circuit of relay 604 and the locking circuit of relay 940 are opened, the release of relay 940 releasing relay 918. With relay 918 normal, a circuit is closed from battery, winding of magnet 910, upper left contact of cam 924, outer right back contact of relay 918 to ground, advancing the sequence switch to position 18. Sequence switch 910 is then advanced to position 1 in a circuit over the lower right contact of cam 920, upper left contact of cam 1029 to ground. Relay 701 is held operated over conductor 729, as long as either sequence switch 1010 or 910 is off normal, the circuit extending to ground either at the upper left contact of cam 1006 or at the lower right contact of cam 925. Sequence switch 1010 is advanced from position 16 to position 17 in a circuit over the lower left contact of cam 1017, right back contact of relay 1005 to ground, and from position 17 to position 18 over the upper right contact of cam 1004, upper contact of cam 921 to ground. When sequence switch 910 has reached position 1, if impulse sequence switch 1210 is also in position 1, a circuit is closed for advancing switch 1010 to position 1 over the upper left contact of cam 1004, conductor 1038 left contacts of cam 1211, conductor 1212, upper left and lower right contacts of cam 943 to ground. With both sequence switches 910 and 1010 in position 1, relay 701 is released connecting battery through resistance 700 to the terminal of brush 522 indicating that the sender is normal and ready to receive future calls.

*Restoration of the link circuit.*

The removal of ground from the left winding of relay 519 also causes the release of relay 518. Relay 518 in turn releases relay 502 and stop magnet 511. Relay 502 in turn releases relay 505, and relay 505 releases relay 531. The release of relay 531 opens the circuit of stop magnet 521. The release of relay 502 also opens the circuit of relay 535 disconnecting the sender finder from the district finder and this circuit is now normal.

*Disconnection of the district selector.*

When the called subscriber hangs up his receiver, relay 238 releases, in turn releasing relay 207. Relay 238 also opens the holding circuit of relay 201 and that relay releases, in turn releasing relay 222. When relay 222 closes its back contact, a circuit is completed from battery through the winding of magnet 210, upper right and lower left contacts of cam 241, left back contact of relay 205, lower contacts of cam 242, back contact of relay 222 to ground. Sequence switch 210 is advanced to position 18 in this circuit. In position 18, the circuit of downdrive magnet 243 is closed over the lower contacts of cam 241, left back contact of relay 205, lower contacts of cam 242 to ground at the back contact of relay 222. The district selector 200 is restored to normal under the control of downdrive magnet 243. When the brushes take up their normal position, a circuit is closed from battery through the winding of sequence switch magnet 210, lower right contact of cam 217, commutator segment 244, brush 287, lower left contact of cam 219 to ground, restoring the district selector to normal.

When switch 210 leaves position 17½, ground is removed from brush 235 and the holding circuit of relay 301 is opened. When relay 301 closes its back contact, it closes a circuit from battery through the winding of magnet 310, upper left contact of cam 304, outer back contact of relay 301 to ground, in which circuit sequence switch 310 is advanced to position 18. In position 18 the circuit of downdrive magnet 322 is closed at the lower contacts of cam 312 and selector 300 is restored to normal. When the brushes reach their normal position, a circuit is closed from battery through magnet 310, upper left contact of cam 304, commutator segment 323, brush 308, lower contact of cam 353 to ground, restoring the switch 310 to position 1, at which time the circuit is in condition for further calls.

*Time alarm and automatic wipe out.*

It will be remembered that when the district selector is connected through to the sender, relay 702 was operated. The operation of relay 702 closes a circuit from battery through the winding of relay 605, brush 614 of timing switch 600 in position 1, left back contact of relay 606, conductor 607, lower right contact of cam 1000, lower left contact of cam 1001, conductor 1002, outer right front contact of relay 702 to ground. Relay 605 locks over its inner left front contact, to conductor 607. The operation of relay 605 prepares a circuit from battery, through the right winding of relay 609, winding of relay 608, back contact of relay 609, brush 611 in position 1 to 4, contact of interrupter 616, outer left front contact of relay 605 to ground, which circuit is completed as soon as interrupter 616 closes its contact. Relay 608 operates in this circuit and locks from battery through the right winding of relay 607, winding of relay 608, left winding of relay 609, contact of relay 608, conductor 607 to ground. Relay 609 does not operate in this locking circuit as long as the contact of interrupter 616 is closed, since it is shunted by the circuit thereover.

When the interrupter 616 opens its contact, relay 609 operates in the above traced locking circuit. When interrupter 619 again closes its contact, a circuit is completed from battery through the right winding of relay 609, inner front contact of relay 609, brush 611, in position 1 to 4, contact of interrupter 616, outer left front contact of relay 605 to ground. This circuit shunts the winding of relay 608 and causes that relay to release. When interrupter 616 closes with relay 609 operated, a circuit is completed from battery, through the winding of stepping magnet 617, outer front contact of relay 609, brush 611 in position 1 to 4, contact of interrupter 616, outer left front contact of relay 605 to ground. Magnet 617 attracts its armature in this circuit. When interrupter 616 opens its contact, relay 609 releases and magnet 617 releases to advance the brushes of switch 600 to position 2. With switch 600 in position 2, a circuit is closed from battery, through the winding of relay 606, inner right contact of relay 605, brush 612 in position 2, conductor 624, upper left contact of cam 1015 to ground. Relay 606 operates and closes a locking circuit for itself through its winding and middle right contact to grounded conductor 607.

Relay 606 closes a circuit from battery through the left winding of relay 625, inner right contact of relay 606 to grounded conductor 624. Relay 625 operates and closes an obvious circuit for register 626. Relay 625 also closes a circuit from battery through the winding of stepping magnet 617, contact of interrupter 627, brush 615, in position 2 and 3, outer contact of relay 625 to ground. Switch 600 is advanced to position 3 and then to position 4 under the control of interrupter 627.

If the operation of the sender has been unduly delayed so that sequence switch 910 is not advanced out of position 1, relay 625 also closes a circuit from battery, winding of relay 604, left contact of cam 1037, left contacts of cam 946, inner contact of relay 625 to ground. The operation of relay 604 opens the circuit through the right winding of relay 603 and causes the release of relay 205 which is connected in this circuit at this time. Since district selector sequence switch 210 is in position 3, the release of relay 205 permits the reoperation of relay 201 which in turn closes a circuit from battery through the winding of relay 222, left contact of cam 206, outer left back contact of relay 207, lower contacts of cam 208, contact of relay 201 to ground. Relay 222 operates and locks as previously described. It also closes a circuit from battery through the winding of sequence switch magnet 210, left contact of cam 224, inner left back contact of relay 207, front contact of relay 222 to ground, advancing the sequence switch to position 4.

When switch 600 moves into position 4, a circuit is completed from battery through the winding of relay 234, conductor 539, brush 517, outer right contact of relay 535, brush 527, brush 615, in position 4, outer contact of relay 625 to ground. Relay 234 operates and closes a circuit from battery through the winding of sequence switch magnet 210, upper contacts of cam 241, outer right front contact of relay 234 to ground. Sequence switch 210 is advanced to position 8 in this circuit. Since selector 200 has not been moved off normal, in position 8 a circuit is closed from battery, winding of magnet 210, lower right contact of cam 217, normal commutator segment 244, brush 287, lower left contact of cam 219 to ground, advancing sequence switch 210 to position 9. A circuit is then closed from battery, winding of magnet 210, lower left contact of cam 224, inner left back contact of relay 207, front contact of relay 222 to ground. Switch 210 is advanced to position 10 in this circuit. It is then advanced to position 15 in a circuit over the upper contacts of the cam 241, outer right front contact of relay 234 to ground.

Meanwhile relay 234 has also connected battery and ground to the windings of relay 201 through interrupters 245 and 246. As interrupters 245 and 246 close their upper and lower contacts, tone through coil 248 is intermittently applied to the line to notify the subscriber that the call cannot be completed. When the subscriber hangs up in response to this tone, the circuit of relay 201 is opened and that relay releases, causing the release of relay 222.

Switch 210 is then advanced from position 15 to position 18 in a circuit over the upper right and lower left contacts of cam 241, left back contact of relay 205, lower contacts of cam 242, back contact of relay 222 to ground. It is then advanced from position 18 to position 1 by means of a circuit through normal commutator segment 244.

When switch 211 leaves position 13, ground is removed from conductor 528, releasing relays 518 and 519. The release of relay 518 releases relay 502 which in turn releases relay 535, thus removing ground from conductor 602 and releasing relay 702. Relay 702 opens the circuit of relay 701 causing it to release. It also removes ground from conductor 607, releasing relays 605 and 606. The release of relay 606 closes an obvious circuit for restoring switch 600 to normal. The release of relay 606 opens the circuit of relays 604 and 625.

If the district selector fails to open the circuit of relay 603, and relay 702 does not release, switch 600 is advanced from position 4 to position 5 under the control of relays 608 and 609 and interrupter 616.

In position 5 a circuit is closed for lamp 620 extending from battery through the lamp, brush 613 in position 5, inner left front contact of relay 606, conductor 621, outer left back contact of relay 703, right back contact of relay 710 to ground. Lamp 620 is lighted steadily in this circuit to indicate to the monitor operator which circuit has failed to release and the condition in which it failed. A circuit is also closed from ground at the outer left front contact of relay 606, over brush 614 in position 5, and the outer left contact of relay 605 to an auxiliary signal. The apparatus can then be released manually.

The circuit of relay 605 is opened when sequence switch 1010 passes from position 1 to position 2, when it passes from position 4 to position 5, from position 10 to position 11 and from position 12 to position 16. A new cycle of operation is started by switch 600 at each of these points in the operation of the sender. Under normal conditions switch 600 will not reach position 4 before the circuit of relay 605 has been opened to restore the switch to normal and to start a new timing operation.

The circuit of lamp 620 is extended to ground through interrupter 725 and through interrupter 726 at subsequent stages of the connection to indicate by the rate of flashing what stage had been reached before the circuit failed to function.

*Call without use of office selector.*

Had the call been one to an office reached directly from the tandem district selector, the translator would have been so positioned as to cause the operation of relay 1342. When sequence switch 910 reaches position 5 following district group selection, a circuit would be completed from battery, left front contact of relay 701, conductor 622, No. 0 counting relay, relays 902 and 915 in parallel, upper right contact of cam 944, conductor 948, outer right front contact of relay 1342 to ground. Sequence switch 910 is advanced to position 6 by the operation of relay 603 at the completion of trunk hunting by the district selector as previously described. The operation of relay 902 prevents the reestablishment of the fundamental circuit and the reception or transmission of false pulses. With switch 910 in position 6, the operated condition of relay 915 closes a circuit from battery through the winding of magnet 910, upper right contact of cam 924, inner left back contact of relay 918, front contact of relay 915 to ground. The circuit in which relay 915 is operated is maintained closed through position 10 of switch 910 so that switch 910 is advanced by means of relay 915 to position 12.

As soon as switch 910 leaves position 10, the No. 0 counting relay, relays 902 and 915 release and switch 910 comes to rest in position 12. Incoming and final selections now take place as previously described.

*Direct relay call indicator call.*

In the case of a call to a manual office equipped with relay call indicator apparatus, the connection will progress as described for a mechanical call through office group selections except that the class switch will be set in position 3, 5, 9, 11, 15 or 17 if the resistance of the loop to the distant office is high, or in position 1, 7 or 13 if the resistance is low. When sequence switch 1010 reaches position 13 at the beginning of district selections, a circuit is closed from battery through the winding of relay 1214, contacts of cam 1215, conductor 1243, right contact of cam 1031, conductor 1032, back contact of relay 1202 to ground. Relay 1214 locks through position 1 to 17 of switch 1210 over its front contact, upper contact of cam 1216, conductor 1217, upper right contact of cam 1029 to ground. The operation of relay 1214 also closes a circuit from battery, winding of sequence switch magnet 1210, lower right contact of cam 1218, lower right and upper left contacts of cam 1219, outer right front contact of relay 1214 to ground. This circuit starts switch 1210 out of position 1 and it is advanced in its rotation to position 12 by means of its master cam. When switch 1210 reaches position 2, a circuit is closed from battery through the winding of relay 1220, lower left and upper right contacts of cam 1221, outer right front contact of relay 1214 to ground. Relay 1220 operates and locks over its inner left front contact, lower contact of cam 1216, conductor 1217, upper right contact of cam 1029 to ground as soon as switch 1210 reaches position 10. This locking circuit is closed in position 10 to 2 of switch 1210.

When sequence switch 910 reaches positions 11 and 12 after the completion of office group selection, a circuit is closed as previously described for advancing switch 1010 to position 14. With switch 910 in position 12 and sequence switch 1010 in position 14, relay 926 is bridged across the trunk conductors in the manner previously described, except that switch 1200 is set for relay call indicator operation and a shunt is closed around resistances 1206 and 1207 from the contact of cam 1213 over the upper contact of cam 927. Relay 926 operates in this circuit and causes the operation of relays 929 and 930 as before. Relay 930 operates and locks over the lower right contact of cam 1208, upper right contact of cam 931 to ground. As before, the operation of relay 930 closes a shunt around the contacts of cam 928, holding relay 926 operated in positions 13 and 14. It also closes a circuit from battery, winding of sequence switch magnet 910, lower right contact of cam 932, left contact of cam 1209, inner left front contact of relay 930, outer right back contact of relay 936 to ground, advancing switch 910 to position 13. Sequence switch 1210 at this time has arrived in position 12 and a circuit is completed from battery, winding of magnet 910, upper right contact of cam 920, right contact of cam 1222, right contact of cam 1223 to ground, advancing switch 910 to position 14. The connection of relay 926 across the trunk lights the lamp at the call indicator operator's position. When this operator closes her key, relay 926 is released, in turn releasing relays 929 and 930. With relay 930 released, sequence switch 910 in position 14, sequence switch 1010 in position 14 and class sequence switch 1200 in an odd position, say 5, the tip conductor from the relay call indicator office extending to conductor 619 is continued over the upper contacts of cam 1019, left contacts of cam 939, outer left back contact of relay 930, conductor 1232 to cams 1225 and 1224 of switch 1210. The ring conductor in turn, which is connected to conductor 618, is extended over the lower contact of cam 1034, right back contact of relay 930, upper right and lower left contacts of cam 928, left contact of cam 1226, conductor 1233 to cams 1227 and 1211. Had switch 1200 been set in position 17 or 13 corresponding to offices reached over low resistance fundamental loops, the left contacts of cam 1226 would not have been closed and resistance 1228 would have been included in the ring conductor.

The sending of relay call indicator pulses takes place in substantially the same manner as disclosed in the above patent to A. E. Lundell et al., No. 1,464,084, and hence will not be discussed in great detail.

The order of transmission of the digits is stations, thousands, hundreds, tens, units for a direct call. As an example of the manner in which circuit are completed for the various type of pulses assume that the party B at the called line is to be signaled. In this case relays 831 and 832 of stations register 830 will have been operated and the following pulses will be sent out: positive in position 13+13½, a heavy negative in position 14+14½, blank in position 15+15½ and a light negative in position 16+16½. In this case the following circuits would be completed in position 13+13½, ground, upper left contact of relay 1006, conductor 1039, upper contact of cam 1229, middle left front contact of relay 1220, lower right contact of cam 1227, to ring conductor 1233 and from battery through resistance 1253, upper contact of cam 1234, conductor 1235, left front contact of relay 831, conductor 886, lower contact of cam 1237, right front contact of relay 1220, upper left contact of cam 1224, to tip conductor 1232. For the heavy negative impulse in position 14+14½, the following circuits are completed: from grounded conductor 1039, lower contact of cam 1229, right front contact of relay 1220, upper left contact of cam 1224, tip conductor 1232; from battery through high resistance 1231, middle left front contact of relay 1220, lower right contact of cam 1227 to ring conductor 1233; and at the same time a parallel circuit from battery through low resistance 1238, back contact of relay 1239, lower left and upper right contacts of cam 1240, conductor 1241, left front contact of relay 832, conductor 887, lower contact of cam 1236, middle left front contact of relay 1220, lower right contact of cam 1227 to ring conductor 1233, thus producing a heavy negative impulse.

It will be noted that in position 15+15½, although ground is connected over the upper contact of cam 1229 to the ring conductor 1233, no path is closed from battery through resistance 1253, to cause an impulse to be sent out. In position 16+16½ ground is connected over the lower contact of cam 1229, right front contact of relay 1220, upper left contact of cam 1224, to tip conductor 1232 and battery is connected through high resistance 1231 over the middle left front contact of relay 1220, lower right contact of relay 1227 to ring conductor 1233 to produce a light negative impulse, there being no path closed through the registers.

Switch 1210 is started out on its revolution by means of a circuit extending through its winding, lower left contact of cam 1218, left front contact of relay 1214, upper right and lower left contacts of cam 943, inner left back contact of relay 930, to ground at the outer left back contact of relay 936, which circuit is completed when relay 930 releases due to the response of the distant operator.

When sequence switch 1210 reaches position 17, the locking circuit of relay 1214 is opened and that relay releases, closing at its back contact a circuit through the winding of magnet 1210, upper left contact of cam 1218, left front contact of relay 1220, right back contact of relay 1214 to ground, which circuit is closed as soon as switch 1210 reaches position 1, to start the switch on its second revolution. As soon as switch 1210 leaves position 2 in this second revolution, the locking circuit of relay 1220 is opened and that relay releases. The pulses for the hundreds, tens and units digits are transmitted to tip conductor 1232 over the right back contact of relay 1220 and the upper right contact of cam 1224, and to the ring conductor 1233, over the middle left back contact of relay 1220 and the lower left contact of cam 1227. When switch 1210 reaches position 13 on its second revolution these paths are opened and, since relay 1220 is released, the paths formerly traced for the impulses are also open and hence no pulses are sent out in positions 13 to 18 of the second revolution. Switch 1210 is started on the second half of its second revolution by means of a circuit from battery through the winding of magnet 1210, upper right contact of cam 1218, right back contact of cam 1214 to ground. In positions 13 to 16 of the second revolution, a circuit is closed for relay 2139 through its winding and the lower right and upper left contacts of cam 1221 to ground at the back contact of relay 1214. The operation of relay 1239 closes a circuit from battery through the winding of the No. 0 counting relay, upper contact of cam 941, front contact of relay 1239 to ground. The No. 0 counting relay operates and locks as usual through the windings of relays 902 and 915. When switch 1210 leaves position 16, relay 1239 releases permitting the operation of relays 902 and 915 in the locking circuit of the No. 0 counting relay. Relay 915 closes a circuit from battery, winding of sequence switch magnet 910, upper right contact of cam 924, inner right back contact of relay 918, front contact of relay 915 to ground, advancing sequence switch 910 to position 15, in which position the pulsing leads are opened. Switch 910 is advanced to position 16 over the upper left contact of cam 920 to ground at the back contact of relay 603, in the manner previously described in connection with a call to a mechanical office. In position 16 relay 604 is operated, opening the circuit through the right winding of relay 603 to advance district selector 210. The district selector then initiates the disconnection of the sender in the same manner as described.

*Tandem relay call indicator calls.*

If a call is received which must be completed through still another tandem office, the designation is registered in the same manner and the call proceeds as for a direct call indicator call except that class switch 1200 is set in position 6 or 16. When switch 1010 arrives in position 13, relay 1214 operates as described in connection with a non-tandem call and relay 1230 is operated in parallel therewith over the contacts of cam 1244, and the lower right and upper left contacts of cam 1219, extending from thence over the contacts of cam 1215, as described for the operation of relay 1214. Relay 1214 locks as before. With switch 1200 in position 6 or 16, the circuit in which switch 1210 was given a preliminary setting in position 12 is not completed and switch 1210 remains in position 1 until the pulsing leads are connected through.

When the tandem office responds to the connection of relay 926 across the outgoing trunk, relay 926 is released, in turn releasing relays 929 and 930, these relays having been operated as for a direct call. Relay 930 releases extending the pulsing leads to conductors 1232 and 1233 as above. With relay 930 released a circuit is closed from battery through the winding of magnet 1210, lower left contact of cam 1218, left front contact of relay 1214, upper right and lower left contacts of cam 943, inner left back contact of relay 930, outer right back contact of relay 936 to ground. Switch 1210 moves under the control of its master cam to position 12, during which time the pulses representing the tandem digits are sent out over the left front contacts of relay 1230 and the lower contact of cam 1224 to conductor 1232, and the upper contact of cam 1227 to conductor 1233.

When switch 1210 reaches position 11, the same circuit which advanced it out of position 1 is closed for advancing it out of position 12 and it continues to position 1 under the control of the master cam. The circuits for transmitting the stations and numerical digit pulses are the same as described for a direct call. When switch 1210 leaves position 13, the circuit of relay 1230 is opened and that relay releases. The remainder of the operation is as described for a direct call.

What is claimed is:

1. In a telephone exchange system, a register sender, a plurality of translators divided into groups in accordance with classification of service, and means for selectively associating said sender with an idle translator of a particular one of said groups.

2. In a telephone exchange system, a register sender, a plurality of translators divided into groups in accordance with classification of service, means for controlling said sender to select one of said groups, and means to associate said sender with an idle translator of the selected group.

3. In a telephone exchange system, a register sender, a plurality of groups of translators each group serving to translate a different class of office designations, a finder switch for each of said groups of translators, and means in said sender for causing a particular finder to select an idle translator in the group served by it.

4. In a telephone exchange system, a register sender comprising a plurality of registers for registering office designations, a plurality of groups of translators each group serving to translate a different class of office designations, a finder switch individual to each group of translators, and means operated in accordance with a registered office designation to initiate the operation of the corresponding finder switch to select an idle translator for translating the registered office code.

5. In a telephone exchange system, a register sender comprising a plurality of registers for registering office designations, a plurality of translators, means for selecting one of said translators, means for establishing a fundamental circuit connecting said translator and said sender, a plurality of counting relays in said sender, and means for positioning said translator under the control of said fundamental circuit, said counting relays and said registers.

6. In a telephone exchange system, a register sender comprising a plurality of registers for registering office designations, a plurality of translators, means under the control of said registers for selecting one of said translators, means for establishing a fundamental circuit connecting said translator and said sender, a plurality of counting relays in said sender, and means for positioning said translator under the control of said fundamental circuit, said counting relays and said registers.

7. In a telephone exchange system, a register sender comprising a plurality of registers for registering office designations, a plurality of groups of translators, means under the control of said registers for selecting one of said groups of translators, means for selecting an idle translator in the selected group, means for establishing a fundamental circuit connecting said translator and said sender, a plurality of counting relays in said sender, and means for positioning said translator under the control of said fundamental circuit, said counting relays and said registers.

8. In a telephone exchange system, a register sender comprising a plurality of registers, a plurality of groups of translators, means under the control of said registers for selecting an idle translator of a particular group, and other means also under the control of said registers for positioning said selected translator.

9. In a telephone exchange system, selector switches, a register sender comprising a plurality of primary registers for registering the wanted office designation, a plurality of secondary registers, a plurality of translators, a plurality of tertiary registers, means under control of said primary registers for setting said secondary registers, means under the control of said secondary registers for selecting and positioning an idle translator, and means under the control of said translator for setting said tertiary registers in position to control said selector switches to select the wanted office.

10. In a telephone exchange system, automatic switches, a register sender, a plurality of translators common to said senders, means to select an idle translator, means to position said translator, means to set a group of registers in said sender in accordance with the position assumed by said translator, means to release said translator by a setting of said register, and means in said sender to control said automatic switches in accordance with the setting of said registers.

11. In a telephone exchange system, automatic switches, a register sender, a plurality of translators common to said sender, a group of registers to control the selection of a translator, means to position a selected translator, means to set other registers in accordance with the position assumed by said translator, means to release said translator by the setting of said other registers, and means in said sender to control said automatic switches in accordance with the setting of said other registers.

12. In a telephone exchange system, automatic switches, a register sender, a plurality of groups of translators common to said sender, a group of registers to control the selection of a group of translators, means to select an idle translator of the selected group, means to position said selected translator, means to set other registers in accordance with the position assumed by said translator, means to release said translator by the setting of said other registers, and means in said sender to control said automatic switches in accordance with the setting of said other registers.

13. In a telephone exchange system, automatic switches, a register sender, a plurality of groups of translators each group serving to control a different class of office designations, a finder switch individual to each group of translators, a group of registers, means operated in accordance with the setting of said registers to initiate the operation of a particular finder switch to select an idle translator in the corresponding group, means to position said selected translator, means to set other registers in accordance with the position assumed by said translator, means to release said translator by the setting of said other registers, and means in said sender to control said automatic switches in accordance with the setting of said other registers.

14. In a telephone exchange system, automatic switches, a register sender, a plurality of translators common to said sender, a group of registers to control the selection of a translator, means for establishing a fundamental circuit connecting said translator and said sender, a plurality of counting relays in said sender, means for positioning said translator under the control of said fundamental circuit, said counting relays and said registers, means to set other registers in accordance with the position assumed by said translator, means to release said translator by the setting of said other registers, and means in said sender to control said automatic switches in accordance with the setting of said other registers.

15. In a telephone exchange system, automatic switches, a register sender, a plurality of groups of translators common to said sender, a group of registers, means under the control of said registers to select a group of translators, means to select an idle translator of the selected group, means to establish a fundamental circuit connecting said translator and said sender, a plurality of counting relays in said sender, means for positioning said translator under the control of said fundamental circuit, said counting relays and said registers, means to set other registers in accordance with the position assumed by said translator, means to release said translator by the setting of said other registers, and means in said sender to control said automatic switches in accordance with the setting of said other registers.

In testimony whereof, I have signed my name to this specification this 19th day of May, 1925.

WILLIAM G. BLAUVELT.